United States Patent [19]

Harada

[11] Patent Number: 5,113,441
[45] Date of Patent: * May 12, 1992

[54] METHOD FOR SCRAMBLING A TELEVISION SIGNAL AND METHOD AND APPARATUS FOR DESCRAMBLING A SCRAMBLED TELEVISION SIGNAL

[75] Inventor: Kimihito Harada, Tokyo, Japan

[73] Assignee: Pioneer Electronics Corporation, Tokyo, Japan

[*] Notice: The portion of the term of this patent subsequent to Aug. 28, 2007 has been disclaimed.

[21] Appl. No.: 481,270

[22] Filed: Feb. 20, 1990

[30] Foreign Application Priority Data

Apr. 21, 1989 [JP] Japan .................. 1-100298
Apr. 28, 1989 [JP] Japan .................. 1-107874

[51] Int. Cl.$^5$ .......................................... H04N 7/167
[52] U.S. Cl. ....................... 380/15; 380/10; 380/20; 380/19
[58] Field of Search .............. 380/10, 20, 15, 19, 380/20

[56] References Cited

U.S. PATENT DOCUMENTS

| | | | |
|---|---|---|---|
| 3,684,823 | 8/1972 | McVoy | 178/5.1 |
| 3,916,091 | 10/1975 | Kirk, Jr. et al. | 178/5.1 |
| 3,975,585 | 8/1976 | Kirk, Jr. et al. | 178/5.1 |
| 4,064,536 | 12/1977 | Saeki et al. | 380/15 |
| 4,325,079 | 4/1982 | Little | 358/120 |
| 4,348,691 | 9/1982 | Mistry | 358/114 |
| 4,388,643 | 6/1983 | Aminetzah | 358/123 |
| 4,430,699 | 2/1984 | Segarra et al. | 364/200 |
| 4,463,376 | 7/1984 | Osaka et al. | 358/120 |
| 4,484,027 | 11/1984 | Lee et al. | 178/32.13 |
| 4,531,020 | 7/1985 | Wechselberger et al. | 178/22.08 |
| 4,535,355 | 8/1985 | Arn et al. | 358/123 |
| 4,600,942 | 7/1986 | Field et al. | 358/122 |
| 4,613,901 | 9/1986 | Gilhousen et al. | 358/122 |
| 4,621,285 | 11/1986 | Schilling et al. | 358/120 |
| 4,631,603 | 12/1986 | Ryan | 360/37.1 |
| 4,688,247 | 8/1987 | Davidov | 380/19 |
| 4,691,354 | 9/1987 | Palminteri | 380/15 |
| 4,716,558 | 12/1987 | Katayama et al. | 369/33 |
| 4,723,283 | 2/1988 | Nagasawa et al. | 380/20 |
| 4,736,422 | 4/1988 | Mason | 380/20 |
| 4,790,010 | 12/1988 | Sgrignoli | 380/10 |
| 4,794,643 | 12/1988 | Saeki et al. | 380/15 |
| 4,802,215 | 1/1989 | Mason | 380/21 |
| 4,839,922 | 6/1989 | Imasaki et al. | 380/15 |
| 4,953,208 | 8/1990 | Ideno | 380/15 |

Primary Examiner—Thomas H. Tarcza
Assistant Examiner—David Cain
Attorney, Agent, or Firm—Sughrue, Mion, Zinn, Macpeak & Seas

[57] ABSTRACT

A method of scrambling a television signal and a method of and apparatus for descrambling a television signal is provided. An audio signal is used on which a key signal containing compression information and information concerning the position of a vertical blanking interval is superimposed on a portion of the audio signal corresponding to a horizontal blanking interval. In addition, a pseudo-key signal is superimposed on the audio signal at a portion which corresponds to a vertical blanking interval, so that the vertical blanking interval cannot be detected through the detection of the audio signal. As a result, an expansion signal for expanding the signal in the horizontal blanking interval and vertical blanking interval compressed by scrambling cannot be formed in its normal position. Thus, unauthorized access is difficult. Descrambling can be performed by detecting the vertical blanking interval based on the information concerning the position of the vertical blanking interval contained in the key signal, and decoding the information for the position which is transmitted in the form of out-band data. Compression information can then be extracted from the key signal based on the detected vertical blanking interval, and an expansion signal for expanding the signal in the horizontal and vertical blanking periods can be generated.

15 Claims, 17 Drawing Sheets

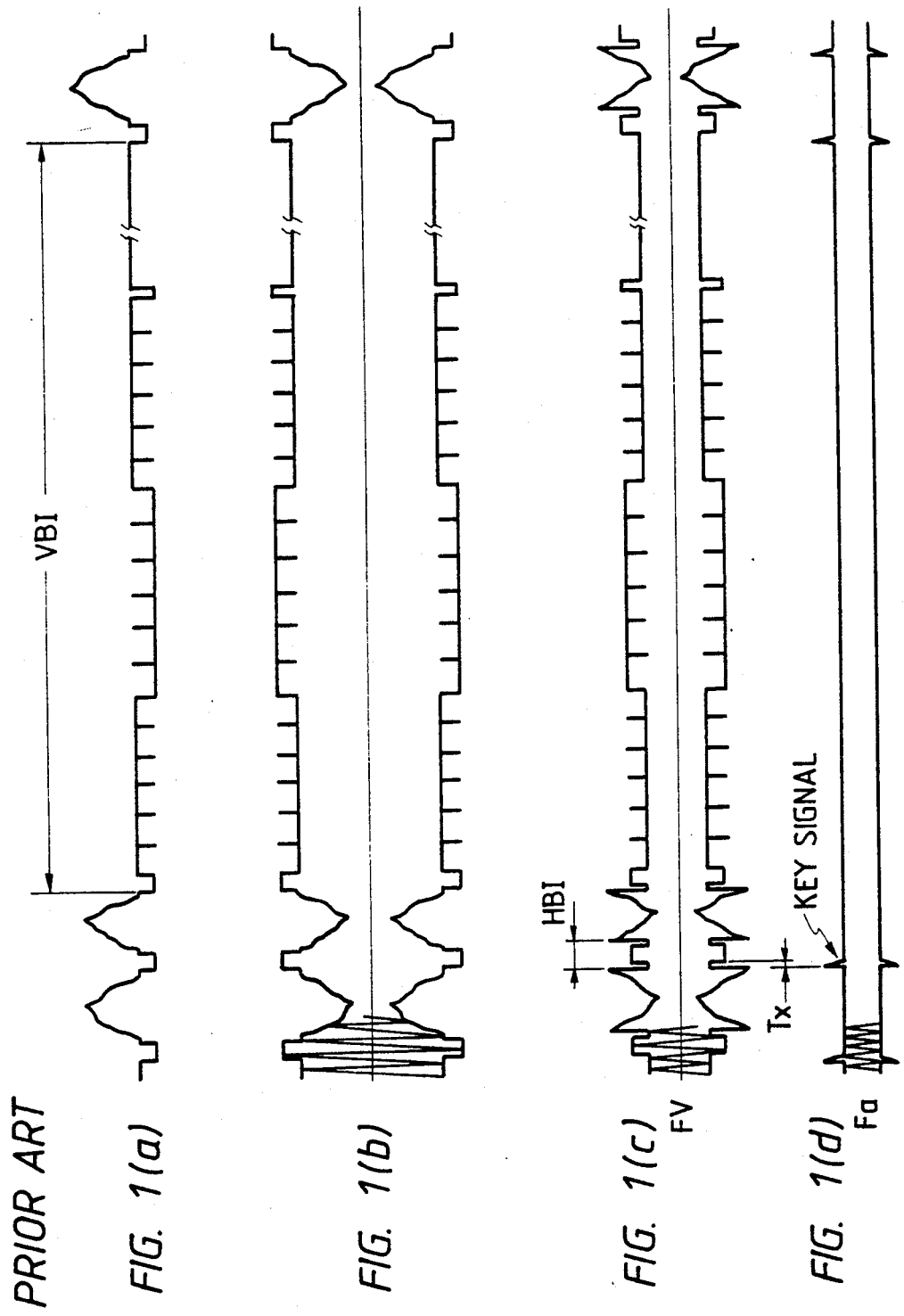

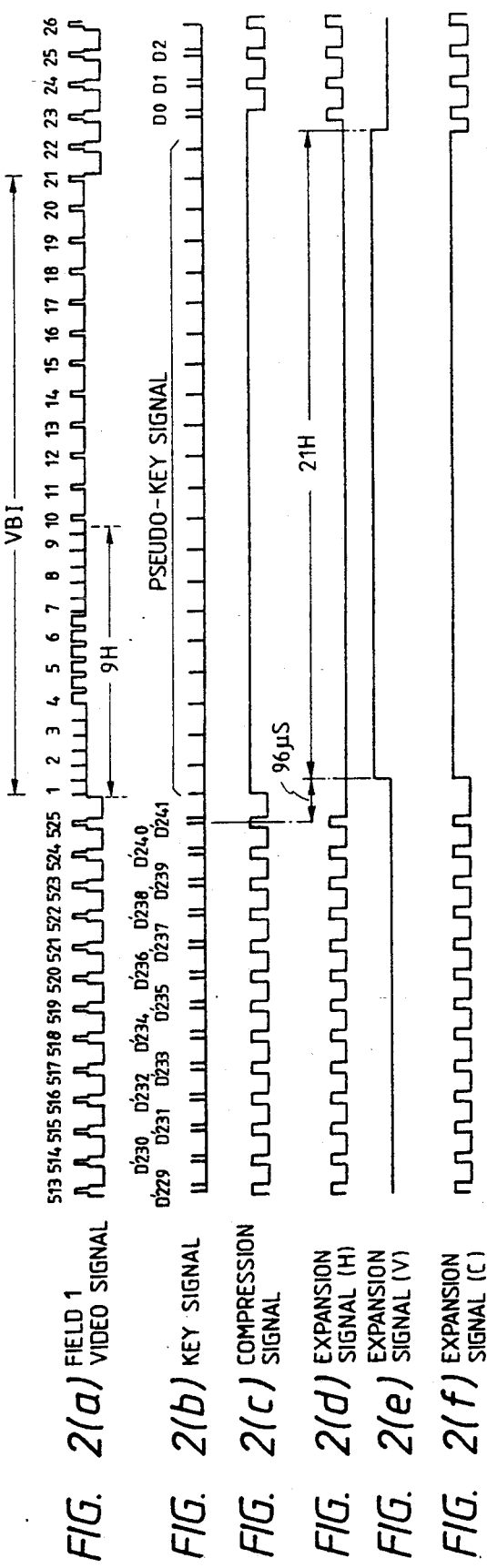

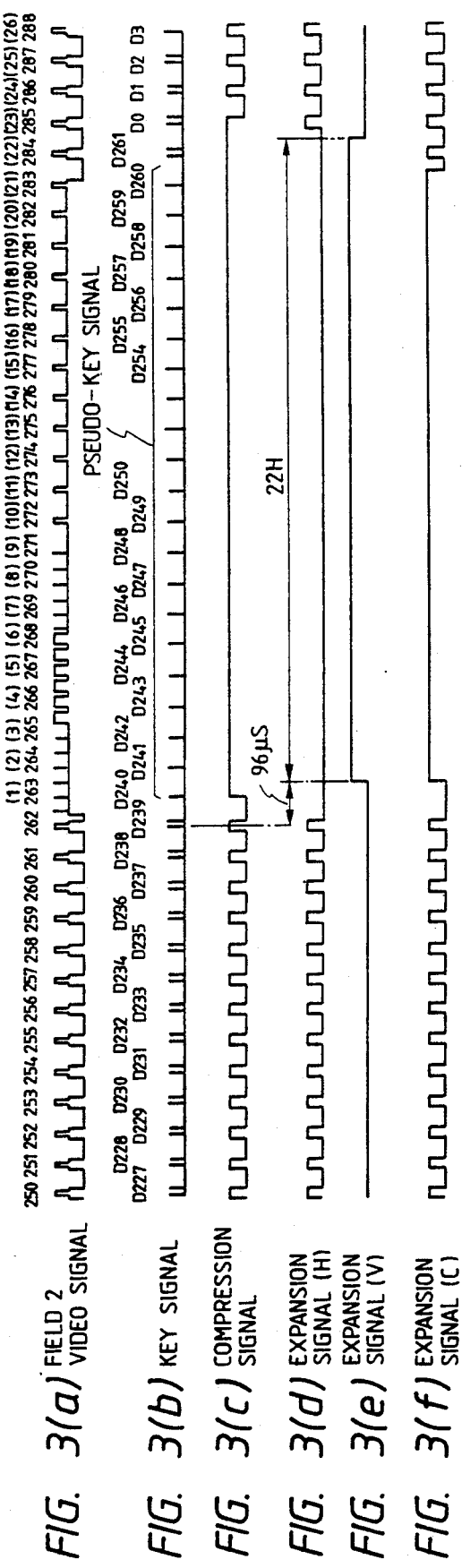

FIG. 4

FIELD 1

| VIDEO SYNC | IN-BAND DATA | | | DATA CONTENTS |
|---|---|---|---|---|
| 23 ~ 31 | D0 D1 | ~ | D8 | TIMING MODE DATA |
| 32 ~ 39 | D9 | ~ | D16 | MULTI-MODE DATA |
| 40 ~ 47 | D17 | ~ | D24 | TAG DATA |
| 48 ~ 55 | D25 | ~ | D32 | IPPV EVENT CODE |
| 56 ~ 63 | D33 | ~ | D40 | CODE  OOOO |
| 64 ~ 71 | D41 | ~ | D48 | OOOOOOOO |
| 72 ~ 79 | D49 | ~ | D56 | OOOOOOOO |
| | | | | |
| 175 ~ 182 | D152 | ~ | D159 | START FRAME |
| 183 ~ 190 | D160 | ~ | D167 | START FRAME |
| 191 ~ 198 | D168 | ~ | D175 | VBI START DATA |
| 199 ~ 206 | D176 | ~ | D183 | COMPRESSION DATA |
| 207 ~ 214 | D184 | ~ | D191 | |
| | | | | |
| 255 ~ 262 | D232 | ~ | D239 | |
| 263 ~ 270 | D240 | ~ | D247 | |
| 271 ~ 278 | D248 | ~ | D255 | |
| 279 ~ 284 | D256 | ~ | D261 | |

FIELD 2

| VIDEO SYNC | IN-BAND DATA | | | DATA CONTENTS |
|---|---|---|---|---|
| 285 ~ 293 | | | | |
| 284 ~ 292 | D'0 D'1 | ~ | D8 | TIMING MODE DATA |
| 293 ~ 300 | D'9 | ~ | D'16 | MULTI-MODE DATA |
| 301 ~ 308 | D'17 | ~ | D'24 | TAG DATA |
| 309 ~ 316 | D'25 | ~ | D'32 | IPPV EVENT CODE |
| 317 ~ 324 | D'33 | ~ | D'40 | CODE  OOOO |
| 325 ~ 332 | D'41 | ~ | D'48 | OOOOOOOO |
| 334 ~ 341 | D'49 | ~ | D'56 | OOOOOOOO |
| | | | | |
| 438 ~ 445 | D'153 | ~ | D'161 | START FRAME |
| 446 ~ 453 | D'162 | ~ | D'169 | START FRAME |
| 454 ~ 461 | D'170 | ~ | D'177 | VBI START DATA |
| 462 ~ 469 | D'178 | ~ | D'185 | COMPRESSION DATA |
| 470 ~ 477 | D'186 | ~ | D'193 | |
| | | | | |
| 518 ~ 525 | D'234 | ~ | D'241 | |
| 1 ~ 8 | D'242 | ~ | D'249 | |
| 9 ~ 16 | D'250 | ~ | D'257 | |
| 17 ~ 22 | D'258 | ~ | D'262 | |

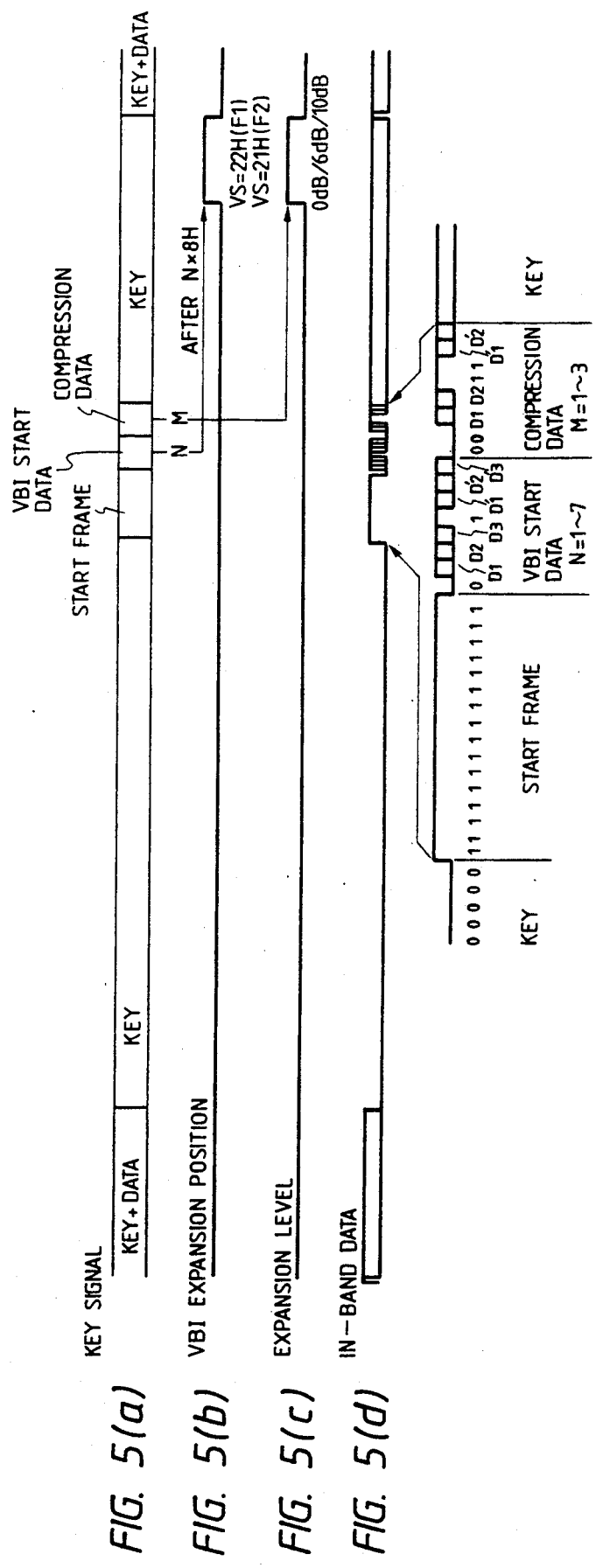

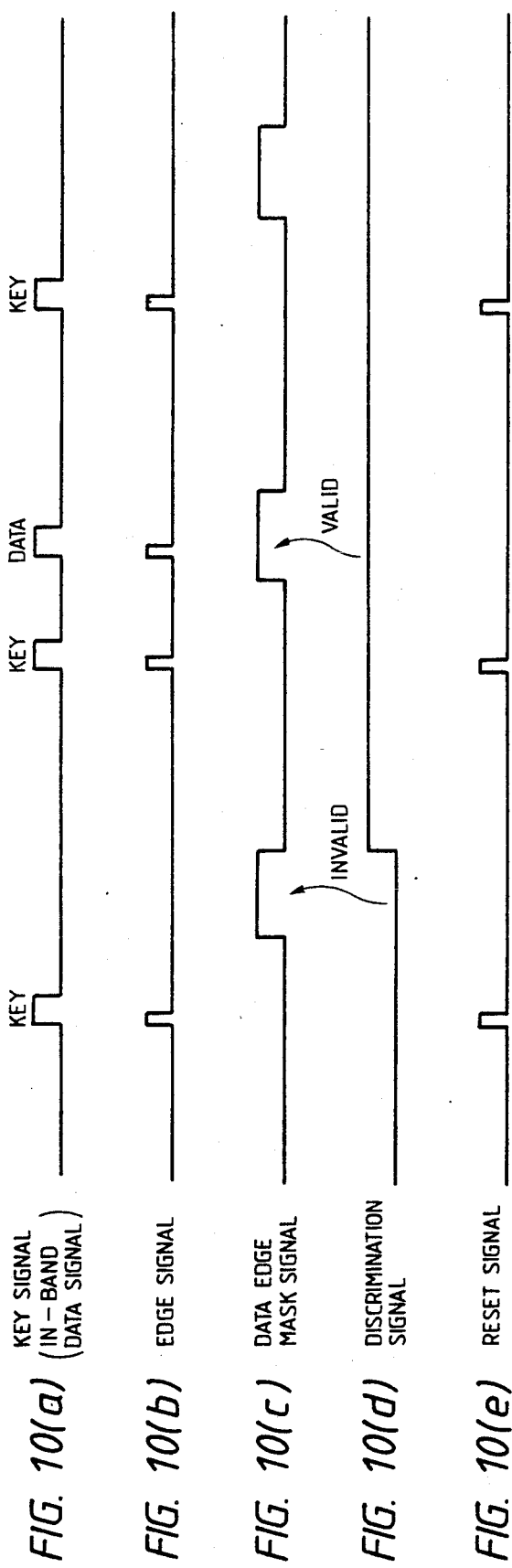

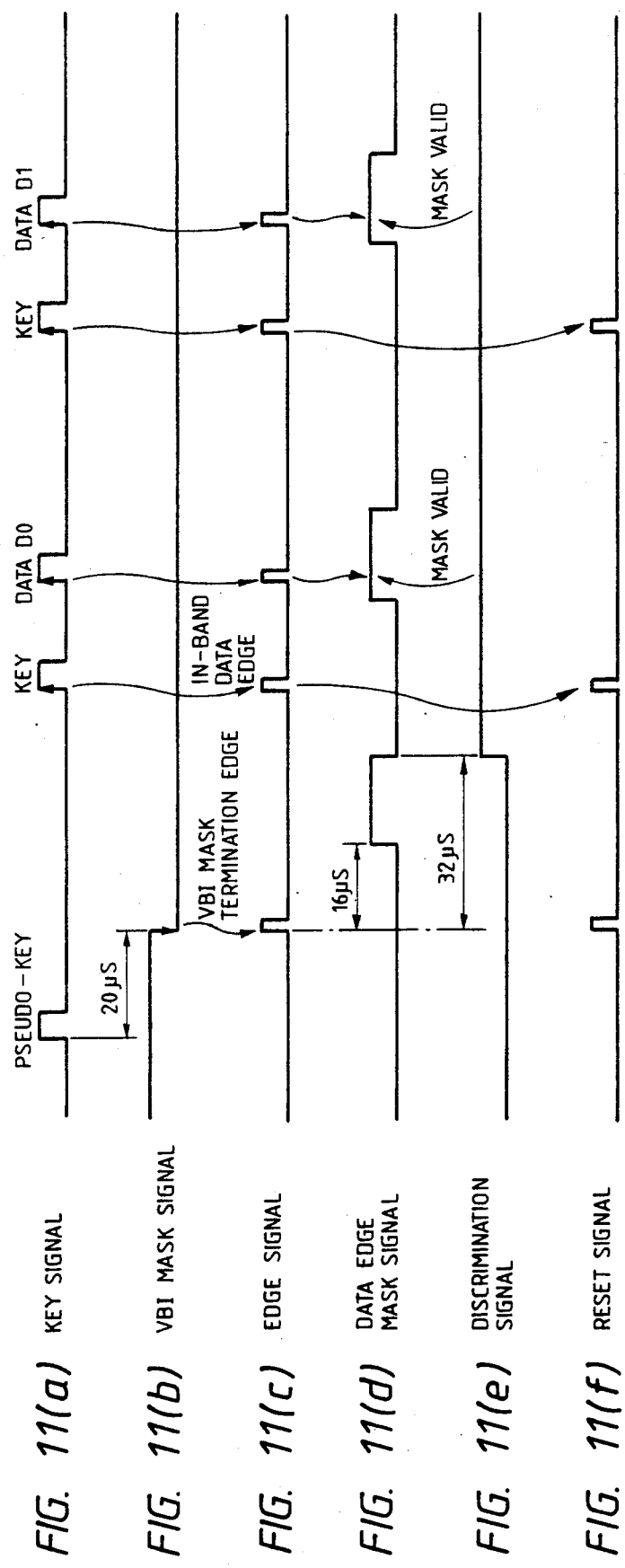

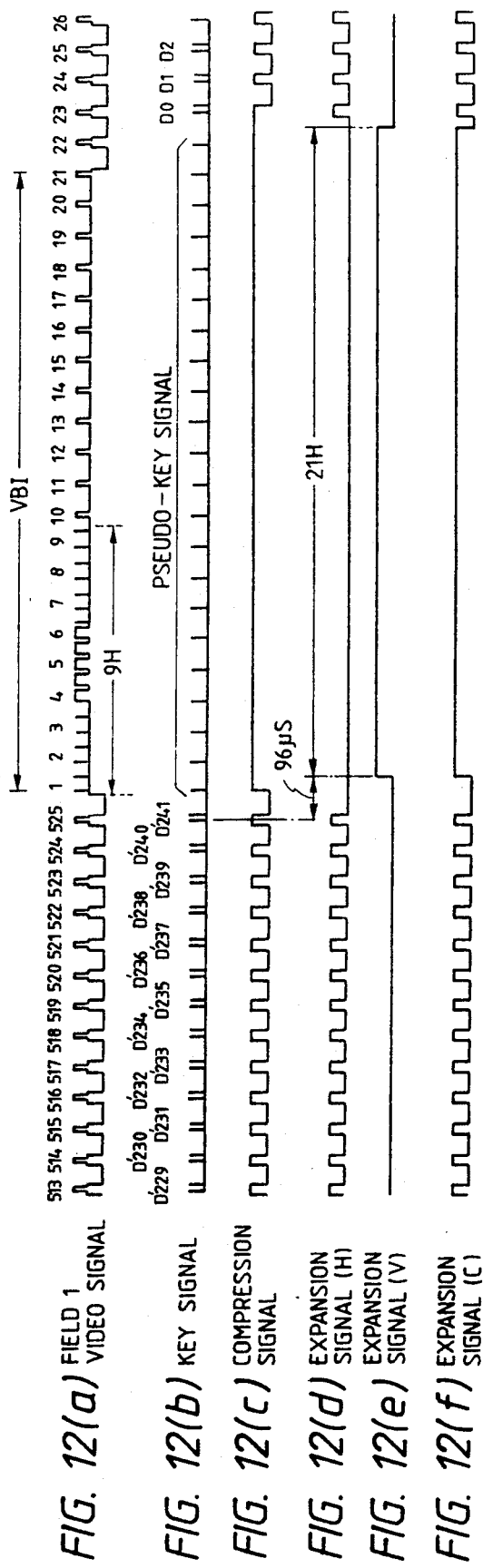

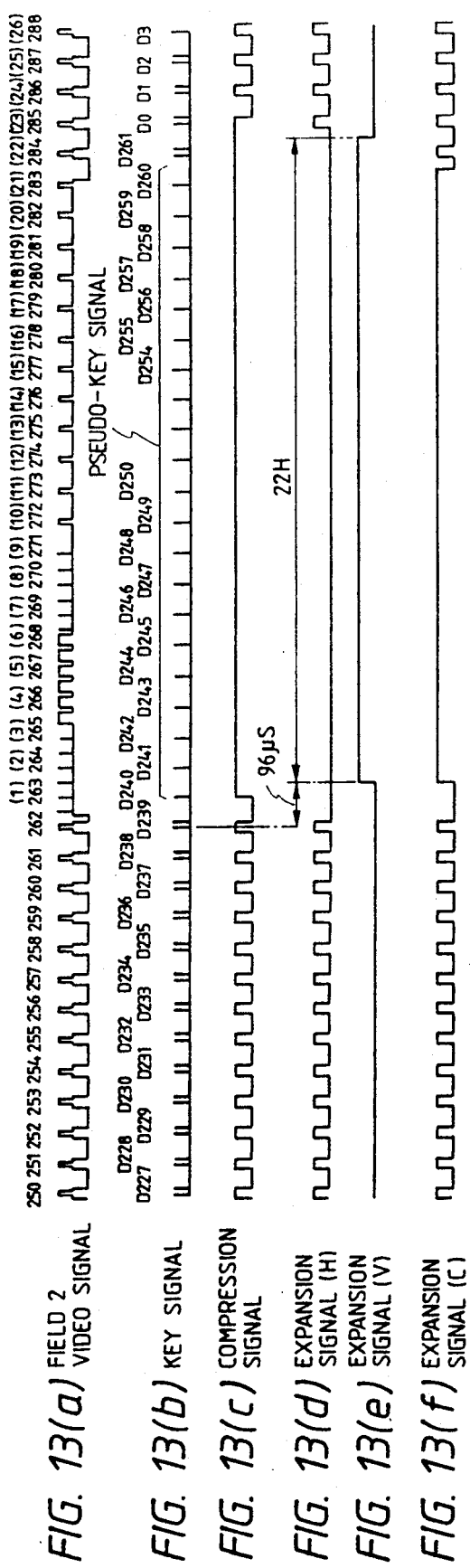

FIG. 14

FIELD 1

| VIDEO SYNC | IN-BAND DATA | DATA CONTENTS |
|---|---|---|
| 23 ~ 31 | D0 D1 ~ D8 | TIMING MODE DATA |
| 32 ~ 39 | D9 ~ D16 | MULTI-MODE DATA |
| 40 ~ 47 | D17 ~ D24 | TAG DATA |
| 48 ~ 55 | D25 ~ D32 | IPPV EVENT CODE |
| 56 ~ 63 | D33 ~ D40 | CODE ○○○○ |
| 64 ~ 71 | D41 ~ D48 | ○○○○○○○○ |
| 72 ~ 79 | D49 ~ D56 | ○○○○○○○○ |
| 175 ~ 182 | D152 ~ D159 | START FRAME |
| 183 ~ 190 | D160 ~ D167 | START FRAME |
| 191 ~ 198 | D168 ~ D175 | VBI START DATA |
| 199 ~ 206 | D176 ~ D183 | VBI-REFLECTED FIELD DATA |
| 207 ~ 214 | D184 ~ D191 | COMPRESSION DATA |
| 255 ~ 262 | D232 ~ D239 | |
| 263 ~ 270 | D240 ~ D247 | |
| 271 ~ 278 | D248 ~ D255 | |
| 279 ~ 283 | D256 ~ D260 | |

FIELD 2

| VIDEO SYNC | IN-BAND DATA | DATA CONTENTS |
|---|---|---|
| 284 ~ 292 | D'0 D'1 ~ D8 | TIMING MODE DATA |
| 293 ~ 300 | D'9 ~ D'16 | MULTI-MODE DATA |
| 301 ~ 308 | D'17 ~ D'24 | TAG DATA |
| 309 ~ 316 | D'25 ~ D'32 | IPPV EVENT CODE |
| 317 ~ 324 | D'33 ~ D'40 | CODE ○○○○ |
| 325 ~ 332 | D'41 ~ D'48 | ○○○○○○○○ |
| 334 ~ 341 | D'49 ~ D'56 | ○○○○○○○○ |
| 438 ~ 445 | D'153 ~ D'161 | START FRAME |
| 446 ~ 453 | D'162 ~ D'169 | START FRAME |
| 454 ~ 461 | D'170 ~ D'177 | VBI START DATA |
| 462 ~ 469 | D'178 ~ D'185 | VBI-REFLECTED FIELD DATA |
| 470 ~ 477 | D'186 ~ D'193 | COMPRESSION DATA |
| 518 ~ 525 | D'234 ~ D'241 | |
| 1 ~ 8 | D'242 ~ D'249 | |
| 9 ~ 16 | D'250 ~ D'257 | |
| 17 ~ 22 | D'258 ~ D'262 | |

METHOD FOR SCRAMBLING A TELEVISION SIGNAL AND METHOD AND APPARATUS FOR DESCRAMBLING A SCRAMBLED TELEVISION SIGNAL

BACKGROUND OF THE INVENTION

The present invention relates to a method for scrambling a television signal in a CATV system to prohibit reception of the television signal by subscribers other than those specified, and to a method and apparatus for descrambling a scrambled television signal.

In a CATV system, a subscriber contracting to receive chargeable programs pays a charge every month for every program or for every channel. It is, therefore, necessary to prohibit reception for those who have not contracted for the service and who intend to gain unauthorized access. In the CATV system, unauthorized access is prevented since a television signal to be transmitted is subject to scrambling in which synchronizing signals in the television signal are compressed with a compression ratio which is changed, for example, every 15 V (frame) period to thereby disturb a picture so that a normal picture cannot be reproduced unless descrambling processing is performed on the reception side.

FIG. 1 shows a conventional method of scrambling a television signal. In a CATV center, which is where transmission occurs, a television signal having a base band shown in FIG. 1(a) is converted into a television intermediate frequency signal, hereinafter television IF signal, as shown in FIG. 1(b). After the conversion, during a horizontal blanking interval (HBI), consisting of a front porch horizontal synchronizing period and back porch, and a vertical blanking interval (VBI), the video signal is compressed with the same compression ratio as shown in FIG. 1(c), and a key signal containing the compression ratio data of the television signal is superimposed on an audio IF signal in synchronism with the horizontal synchronizing signal of the video signal as shown in FIG. 1(d). Each key signal precedes the horizontal blanking interval by 3 to 20 μsec (Tx).

In a CATV home terminal unit having a descrambling function for a television signal which has been scrambled in a manner as described above, the incoming transmitted key signal is detected, and the compression data is extracted and decoded. An expansion pulse having an amplitude based on the decoded data is generated at the time of the key signal, and the television signal compressed at the transmission side is expanded in the blanking intervals by using the expansion pulse to thereby make it possible to see a normal picture.

In the case of a television signal which has been scrambled by the foregoing scrambling method, however, it is possible for a CATV terminal unit other than a licensed one to obtain unauthorized access if descrambling is made to a certain extent.

One of the descrambling methods for unauthorized CATV access is as follows. A vertical blanking interval (VBI) is detected by a method wherein a key signal which is superimposed by AM modulation on an audio signal in every horizontal blanking interval (HBI), but which is not superimposed on the audio signal in a VBI, is passed through an integrating circuit after AM-detection, or by any other method. A video signal expanded on the basis of the detected VBI is detected to perform synchronizing signal separation to thereby obtain synchronizing signals in the VBI. A free-running timing generator operates thereafter in synchronism with the synchronizing signals. The amplitude of a pulse generated from the free-running timing generator is adjusted on the basis of the integral level of the synchronizing signal in the VBI to form an expansion pulse to carry out descrambling, so as to easily gain unauthorized picture access.

SUMMARY OF THE INVENTION

In view of the foregoing problem in the prior art, an object of the present invention is therefore to provide a method of scrambling a television signal in which unauthorized access cannot be easily performed.

Another object of the invention is to provide a method and apparatus for descrambling a television signal scrambled by the aforementioned method In order to solve the aforementioned problem, according to a first aspect of the present invention, a method of scrambling a television signal in which a television signal is compressed in a horizontal blanking interval and a vertical blanking interval, and a key signal containing information concerning the compression is superimposed on an audio signal during the horizontal blanking interval, is characterized by superimposing a pseudo-key signal on an audio signal during the vertical blanking interval, and adding to this key signal information data concerning the position of the vertical blanking interval.

In addition, according to the first aspect of the present invention, a method of descrambling a television signal scrambled by compressing a television signal in a horizontal blanking interval and a vertical blanking interval, the compressed television signal being transmitted together with an audio signal on which a key signal containing compression information and information concerning the position of the vertical blanking interval is superimposed at a portion of the audio signal corresponding to the horizontal blanking interval, and on which a pseudo-key signal is superimposed at a portion of an audio signal corresponding to the vertical blanking interval, is characterized by the steps of: detecting the vertical blanking interval based on the information concerning the position of the vertical blanking interval contained in the key signal; extracting the information concerning the compression and contained in the key signal, based on the thus detected vertical blanking interval; generating an expansion signal for expanding the television signal in both the horizontal blanking interval and the vertical blanking interval based on the thus extracted information concerning the compression; and expanding the television signal in both the horizontal blanking interval and the vertical blanking interval based on the expansion signal to thereby descramble the television signal.

Further, according to the first aspect of the present invention, the apparatus for descrambling a television signal scrambled by compressing a television signal in a horizontal blanking interval and a vertical blanking interval thereof, the compressed television signal being transmitted together with an audio signal on which a key signal containing compression information and information concerning the position of the vertical blanking interval is superimposed at a portion of the audio signal corresponding to the horizontal blanking interval, and on which a pseudo-key signal is superimposed at a position of an audio signal corresponding to the vertical blanking interval, includes: a vertical blanking interval detection circuit for detecting the vertical blanking interval based on the information concerning the position of the vertical blanking interval contained in the key signal; an information extraction circuit for extracting the information concerning the compression and contained in the key signal, based on the detected vertical blanking interval detected by the vertical blanking interval detection circuit; an expansion signal generation circuit for generating an expansion signal for expanding the television signal in both the horizontal blanking interval and the vertical blanking interval based on the information concerning the compression extracted by the information extraction circuit; and a descrambling circuit for expanding the television signal in both the horizontal blanking interval and the vertical blanking interval based on the expansion signal generated by the expansion signal generation circuit to thereby descramble the television signal.

In the aforementioned configuration, according to the first aspect of the present invention, a pseudo-key signal is superimposed on an audio signal at a portion corresponding to a vertical blanking interval of the video signal. Accordingly, the VBI cannot be detected even if the audio signal is detected. As a result, the signal cannot be expanded in the VBI because no reference exists for generating an expansion signal for expanding the VBI. Accordingly, the free-running timing generator for generating a timing signal for expanding the compressed signal in the horizontal blanking interval cannot be operated because a synchronizing signal for expanding the signal in the VBI cannot be obtained In short, it is impossible to form an expansion signal for expanding the signal in the horizontal blanking interval and the vertical blanking interval compressed by scrambling. Consequently, unauthorized access is made difficult.

Further, in the descrambling method and apparatus of the invention, a pseudo-key signal is superimposed on an audio signal at the portion corresponding to a vertical blanking interval of the audio signal transmitted together with a scrambled television signal from the center. The television signal can be descrambled through the steps of: detecting the vertical blanking interval based on the information concerning the position of the vertical blanking interval and contained in the key signal; extracting information concerning the compression and contained in the key signal, based on the detected vertical blanking interval; generating an expansion signal for expanding the signal in the horizontal blanking interval and vertical blanking interval based on the extracted information concerning the compression; and expanding the signal in the horizontal blanking interval and vertical blanking interval based on the expansion signal.

According to a second aspect of the present invention, a method of scrambling a television signal in which a television signal is compressed in a horizontal blanking interval and a vertical blanking interval, and a key signal containing information concerning the compression is superimposed on an audio signal corresponding to the horizontal blanking interval, is characterized by: superimposing a pseudo-key signal on an audio signal during the vertical blanking interval; adding to the key signal information data concerning the position of the vertical blanking interval; and transmitting in the form of out-band data information to be used in decoding the information concerning the position of the vertical blanking interval.

In addition, according to the second aspect of the present invention, a method of descrambling a television signal which has been scrambled by compressing a television signal in a horizontal blanking interval and a vertical blanking interval, based on a key signal superimposed on a portion of an audio signal corresponding to the horizontal blanking interval and containing compression information and information concerning the position of the vertical blanking interval in the form of in-band data, and based on information transmitted in the form of out-band data and used in decoding the information concerning the position of the vertical blanking interval, the audio signal containing a pseudo-key signal superimposed on an position thereof corresponding to the vertical blanking interval, is characterized by the steps of: decoding the information concerning the position of the vertical blanking interval and contained in the key signal, based on the information transmitted in the form of out-band data; detecting the vertical blanking interval based on the thus decoded information; extracting the information concerning the compression and contained in the key signal, based on the thus detected vertical blanking interval; generating an expansion signal for expanding the signal in both the horizontal blanking interval and the vertical blanking interval based on the thus extracted information concerning the compression; and expanding the signal in both the horizontal blanking interval and the vertical blanking interval based on the expansion signal to thereby descramble the television signal.

Further, according to the second aspect of the present invention, an apparatus for descrambling a television signal which has been scrambled by compressing a television signal in a horizontal blanking interval and a vertical blanking interval, based on a key signal superimposed on a portion of an audio signal corresponding to the horizontal blanking interval and containing compression information and information concerning the position of the vertical blanking interval in the form of in-band data, and based on information transmitted in the form of out-band data and used in decoding the information concerning the position of the vertical blanking interval, the audio signal containing a pseudo-key signal superimposed on a portion thereof corresponding to the vertical blanking interval, is characterized by comprising: a decoding circuit for decoding the information concerning the position of the vertical blanking interval and contained in the key signal, based on the information transmitted in the form of out-band data; a vertical blanking interval detection circuit for detecting the vertical blanking interval based on the thus decoded information; an information extracting circuit for extracting the information concerning the compression and contained in the key signal, based on the vertical blanking interval detected by the vertical blanking interval detecting circuit; an expansion signal generating circuit for generating an expansion signal for expanding the signal in both the horizontal blanking interval and the vertical blanking interval based on the information concerning the compression and extracted by the information extracting circuit; and a descrambling circuit for expanding the signal in both the horizontal blanking interval and the vertical blanking interval based on the expansion signal to thereby descramble the television signal.

In the aforementioned configuration according to the second aspect, as in the first aspect of the invention, a pseudo-key signal is superimposed on an audio signal at a portion corresponding to a vertical blanking interval thereof. Accordingly, the VBI cannot be detected even if the audio signal is detected As a result, the signal cannot be expanded in the VBI because no reference exists for generating an expansion signal for expanding the signal in the VBI. As a result, the free-running timing generator for generating a timing signal for expanding the compressed signal in the horizontal blanking interval cannot be operated because a synchronizing signal for expanding the signal in the VBI cannot be obtained. In short, it is impossible to form an expansion signal for expanding the signal in the HBI and VBI compressed by scrambling. Consequently, unauthorized access is made difficult.

Further, because not only information concerning the position of the VBI is contained in the key signal but also information to be used in decoding the information concerning the position is transmitted as out-band data, the VBI cannot be detected without the two pieces of information. Consequently, unauthorized access is made even more difficult.

Further, in the descrambling method and apparatus of the invention, a pseudo-key signal is superimposed on an audio signal at a position corresponding to a VBI of the video signal and is transmitted together with a scrambled television signal from the center. The television signal can be descrambled through the steps of: detecting the VBI through decoding information concerning the position of the VBI and contained in the key signal based on information transmitted as out-band data; extracting information concerning the compression and contained in the key signal, based on the detected VBI; generating an expansion signal for expanding the signal in the HBI and VBI based on the extracted information concerning the compression; and expanding the signal in the HBI and VBI based on the expansion signal

BRIEF DESCRIPTION OF THE DRAWINGS

FIGS. 1a-1d are a diagram illustrating a conventional scrambling method;

FIGS. 2a-2f and 3a-3f are timing charts for illustrating a television signal scrambling method and descrambling method according to a first aspect of the invention;

FIG. 4 illustrates video synchronizing data versus in-band data;

FIGS. 5a-5d illustrate the principle of performing descrambling by use of the in-band data of FIG. 4;

FIGS. 10a-10e and 11a-11f are timing charts used for explaining the operation of the circuit depicted in FIG. 9;

FIGS. 12a-12f and 13a-13f are timing charts for explaining a television signal scrambling method and descrambling method according to a second aspect of the invention;

FIG. 14 illustrates video synchronizing data versus in-band data;

DETAILED DESCRIPTION OF THE PREFERRED EMBODIMENTS

Figure 6:
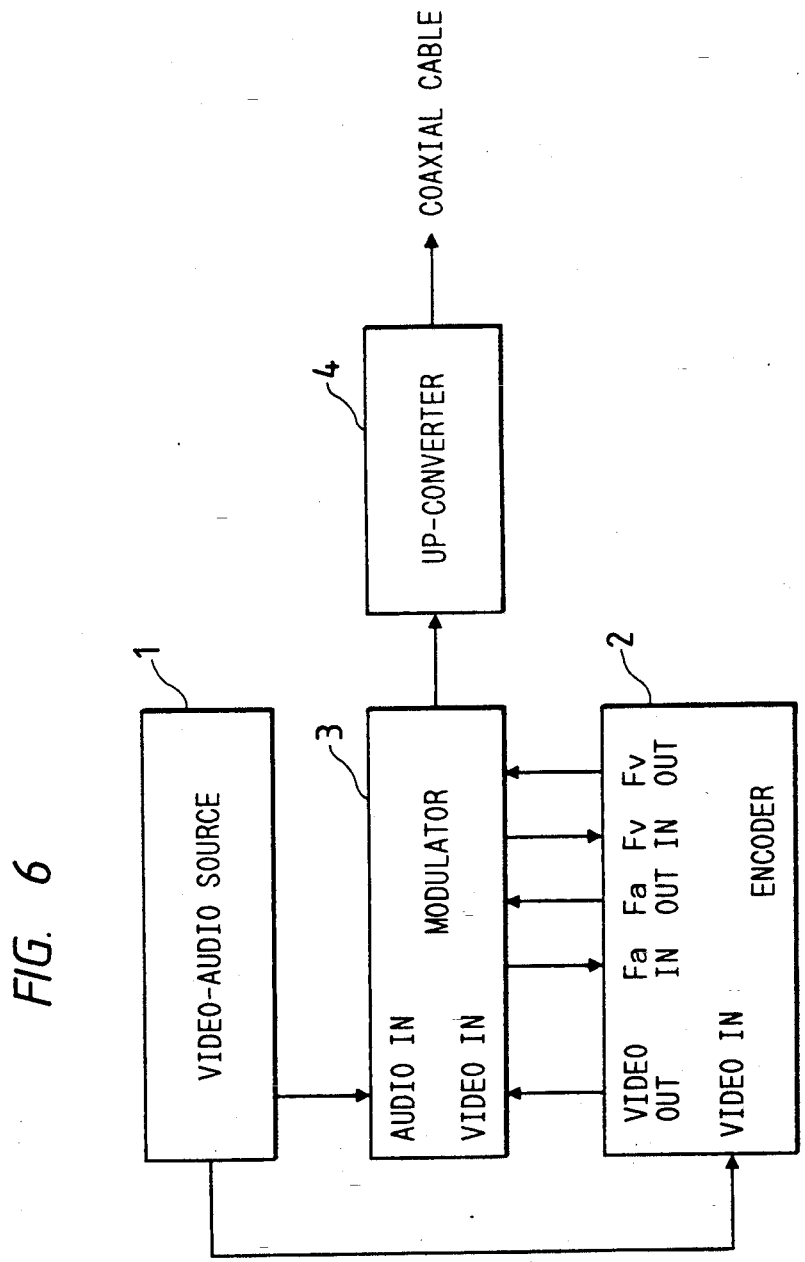
FIG. 6 is a block diagram showing the configuration of a CATV center using the method of the invention for performing scrambling.

Preferred embodiments, according to a first aspect of the present invention, will be described hereunder with references to FIGS. 2 through 11.

FIG. 2 (a) through (f), and FIG. 3 (a) through (f) are timing charts showing video signal as to the front portions of fields 1 and 2 and the rear portions of fields prior to the fields 1 and 2, key signals, compression signals and expansion signals corresponding to the video signals, respectively The television signal scrambling method and descrambling method according to the present invention will be described with reference to these drawings.

The television signal scrambling method according to the present invention is characterized by: inserting a pseudo-key signal in one portion of an audio signal corresponding to the VBI of the video signal with the same period as that of a key signal inserted in the other portion thereof as shown in FIGS. 2(a) and (b) and 3(a) and (b), respectively; adding coded VBI position data to the key signal in the form of in-band data; and compressing both a horizontal blanking interval and a VBI based on a compression signal as shown in FIGS. 2(c) and 3(c), respectively. The aforementioned key and pseudo-key signals are superimposed on the audio signal by amplitude modulation in synchronism with the horizontal blanking interval in the same manner as the conventional key signal.

The relationship between in-band data and video synchronizing signal is shown in FIG. 4 in which, for convenience of description, numbers 1 through 525 are given to video synchronizing signals in the order numbered after the VBI of the previous frame; numbers D0 through D261 are given to in-band data corresponding to the video synchronizing signals 23 through 284; and numbers D'0 through D'262 are given to in-band data corresponding to the video synchronizing signals 285 through 22. Being superimposed on an audio signal, start frames are transmitted by the audio signal through in-band data, D152 to D167 and D'153 to D'169; coded VBI start data are transmitted by the audio signal through in-band data, D168 to D175 and D'170 to D'177; VBI-reflected field data are transmitted by the audio signal through in-band data, D176 to D183 and D'178 to D'185; and compression data are transmitted by the audio signal through in-band data, D176 to D183 and D'178 to D'185.

Other in-band data, such as timing mode data (expressing time from the key timing of a key signal to a horizontal synchronizing signal, being selected from 0, 4, 8, 12 and 16 μsec for every field and reporting the designated time to a terminal side), multi-mode data (expressing the mode of compression level), tag data, IPPV (impulse pay per view) even data, and the like, are superimposed on an audio signal and transmitted by the audio signal.

The video signal scrambled through compression based on the compression signal as shown in FIGS. 2(c) and 3(c), respectively, is received by a terminal To perform descrambling, expansion signals as shown in FIGS. 2(d)-(f) and 3(d)-(f), respectively, are generated in the terminal based on the VBI start data and compression data in the in-band data.

Specifically, the above-mentioned start frame, VBI start data and compression data of the in-band data are configured as shown in FIG. 5(d). That is, the start frame is composed of 16 bits, the data of which are continuously "1". The VBI start data is composed of 1 bit of "0", 3 bits of positive data, 1 bit of "1", and 3 bits of negative data. The compression data is composed of 2 bits of "0", 2 bits of positive data, 2 bits of "1", and 2 bits of negative data. The data of 3 bits expressing the VBI start position is composed of the number N-1 through 7. The data of 2 bits expressing the compression level is composed of the number M=1 through 3.

In the terminal having received these data as shown in FIG. 5(b) and (c), the number N is multiplied by 8H (H is a horizontal period) and the start position of the VBI is obtained to thereby generate expansion signals the durations of which are 22H for the field 1 and 21H for the field 2, respectively. By setting the levels of the expansion signals to 0 dB when M=1, 6 dB when M=2 and 10 dB when M=3, television signals are expanded based on the expansion signals so that the television signals are descrambled.

An example of the configuration of a center-side apparatus realizing the television signal scrambling method according to the present invention and an example of the configuration of a terminal apparatus realizing the method of descrambling the television signal scrambled by the scrambling method are described with reference to FIGS. 6 through 9.

Figure 7:
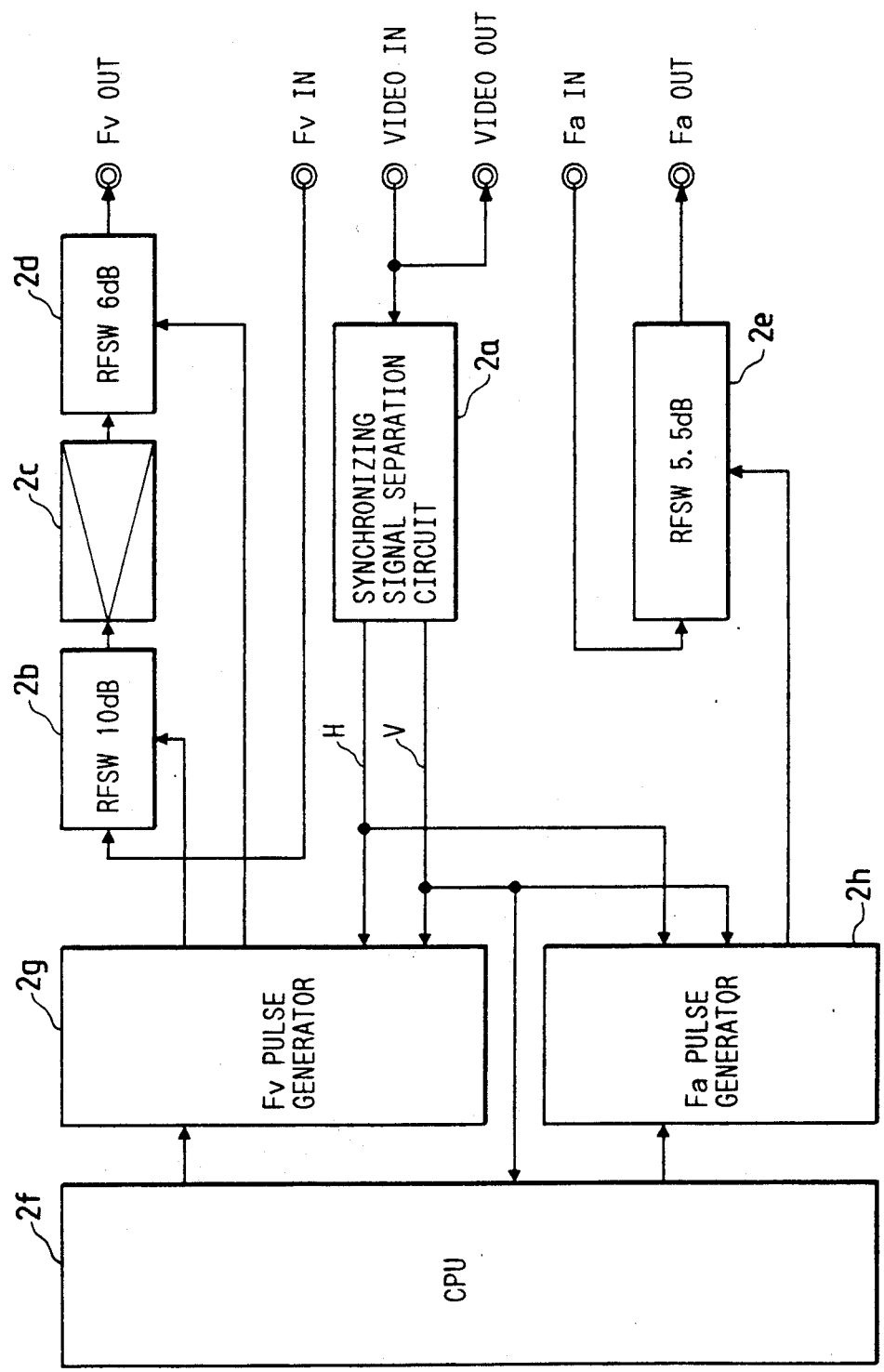
FIG. 7 is a block diagram showing a specific example of the circuit which is a part of FIG. 6.

FIGS. 6 and 7 show an example of the configuration of a CATV center-side apparatus. In FIG. 6, the reference numeral 1 designates a video and audio source such as a video tape recorder, a video disc player, or the like. A video signal from the video and audio source is fed to a video input terminal (VIDEO IN) of the encoder 2 which performs scrambling. The video signal is partly passed through the encoder 2 to be fed to a video input terminal (VIDEO IN) of the modulator 3 through a video output terminal (VIDEO OUT) of the encoder 2. The modulator 3 converts into IF signals the video and audio signals fed to the video input terminal (VIDEO IN) and the audio input terminal (AUDIO IN), respectively. The television IF signal Fv and audio IF signal Fa thus converted by the modulator 3 are returned to the encoder 2 in which the television IF signal Fv is compressed in the horizontal blanking interval and vertical blanking interval (VBI) at predetermined compression rates based on the compression signal as shown in FIGS. 2(c) and 3(c), respectively. Key and pseudo-key signals are superimposed on the audio IF signal Fa respectively at a portion corresponding to the horizontal blanking interval and in a VBI in synchronism with the video synchronizing signal of the video signal, as shown in the diagrams (b) of FIGS. 2 and 3.

The television IF signal Fv compressed in the HBI and VBI, and the audio IF signal Fa having the key and pseudo-key signals superimposed thereon as described above are fed from the encoder 2 to the modulator 3. After being mixed with each other in the modulator 3, and the television IF signal Fv and the audio IF signal Fa are fed to an up-converter 4. After being converted into a predetermined frequency, the television IF signal Fv and the audio IF signal Fa are sent out through a transmission circuit such as a coaxial cable or the like.

Such a configuration as shown in FIG. 7 can be used as the encoder 2. In FIG. 7, the video signal fed from the video source 1 to the video input terminal (VIDEO IN) is fed to a synchronizing signal separation circuit 2a in which a horizontal synchronizing signal H and a vertical synchronizing signal V are extracted from the video signal. The television IF signal Fv received from the modulator 3 is returned to the modulator 3 through a 10 dB RF switch 2b, an amplifier 2c, and a 6 dB RF switch 2d. The audio IF signal Fa received from the modulator 3 is returned to the modulator 3 through a 5.5 dB RF switch 2e.

The 10 dB RF switch 2b and the 6 dB RF switch 2d are turned on and off based on the Fv pulse generated by an Fv pulse generator 2g which operates under the control of a CPU 2f. When the switches are turned on, the television IF signal is compressed in the HBI and VBI by 10 dB and 6 dB, respectively. On the other hand, the 5.5 dB RF switch 2e is turned on and off based on the Fa pulse generated by an Fa pulse generator 2h which operates under control by the CPU 2f. When the switch 2e is turned on, the audio IF signal Fa is compressed in the period of insertion of the key and pseudo-key signals by 5.5 dB.

The CPU 2f operates according to a predetermined program to issue in-band data arranged as shown in FIG. 4 corresponding to the vertical synchronizing signal V received from the synchronizing separation circuit 2a to thereby feed the in-band data to the Fa pulse generator 2h. The Fa pulse generator 2h having the in-band data fed thereto generates Fa pulses corresponding to the key signals synchronized with the horizontal synchronizing signal H, and the in-band data based on the vertical synchronizing signal V and horizontal synchronizing signal H from the synchronizing separation circuit 2a so that the relationship as shown in FIG. 4 is established between the in-band data and the video synchronizing signal. The Fa pulses are fed to the 5.5 dB RF switch 2e to thereby turn on and off the switch Consequently, the key and pseudo-key signals including the in-band data are superimposed, by amplitude modulation, on the audio IF signal Fa passing through the 5.5 dB Rf switch 2e.

Further, the CPU 2f counts vertical synchronizing signals V received from the synchronizing separation circuit 2a to establish the rate of compression in the HBI and VBI to 10 dB, 6 dB or 0 dB corresponding to the input of a predetermined number of vertical synchronizing signals V, so that data relative to the set rate of compression are used when the in-band data occur and are fed to the Fv pulse generator 2g.

The Fv pulse generator 2g supplied with the horizontal synchronizing signal H and vertical synchronizing signal V from the synchronizing separation circuit 2a generates Fv pulses to turn on the 10 dB Rf switch 2b or 6 dB RF switch 2d in the HBI and VBI of the television IF signal Fv based on these signals and the data relative to the compression rate given from the CPU 2f. Accordingly, the television IF signal Fv passing through the 10 dB RF switch 2b and the 6 dB RF switch 2d is compressed in the HBI and VBI at predetermined compression rates, respectively.

An example of the configuration of a CATV terminal apparatus for descrambling a signal scrambled in the CATV center side as described above with reference to FIGS. 6 and 7 and transmitted through the coaxial cable will be described hereunder with reference to FIG. 8.

Figure 8:
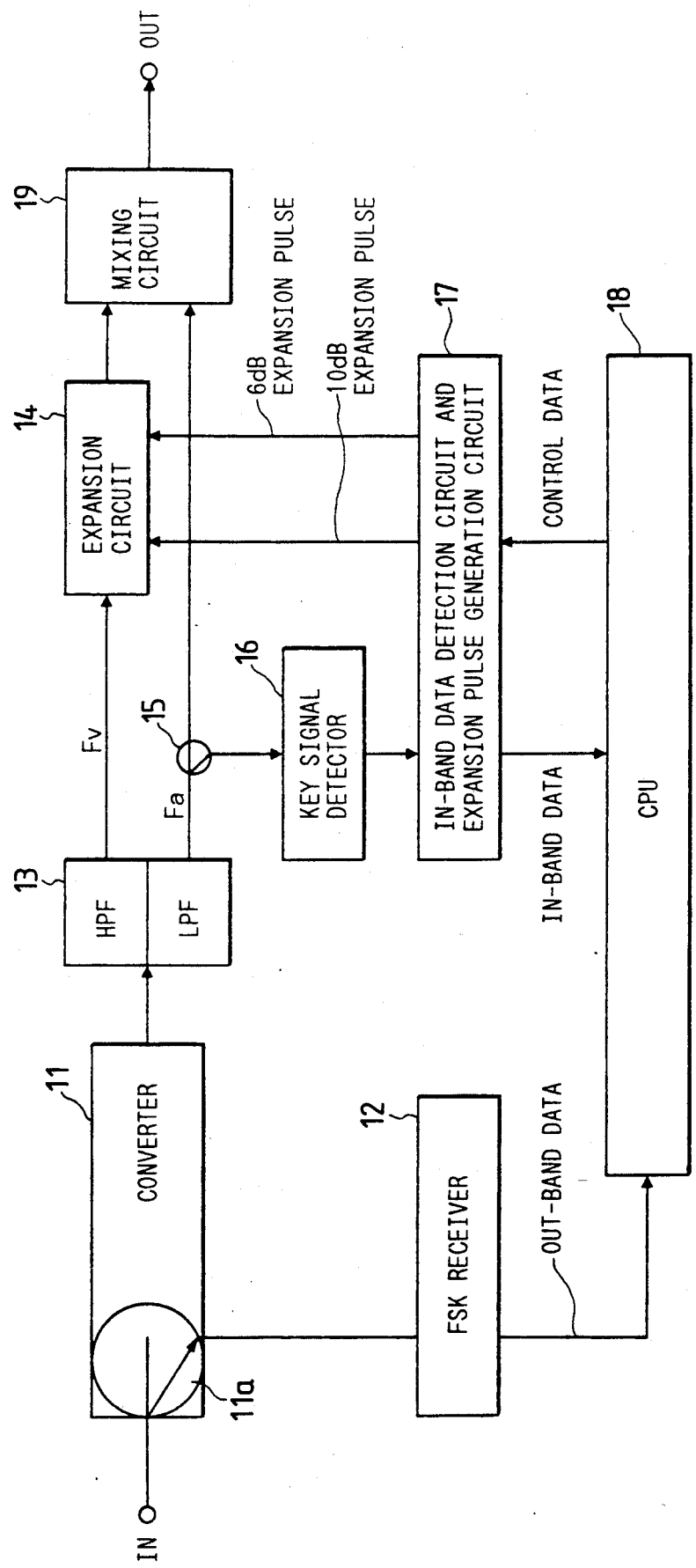
FIG. 8 is a block diagram showing the configuration of a CATV terminal apparatus for descrambling a signal scrambled by the method of the invention.

In FIG. 8, the signal transmitted through the coaxial cable is received in a converter 11 through an input terminal IN. The signal is distributed by a branching device 11a at the inlet portion of the converter 11, so that a part of the signal is fed to an FSK receiver 12 which serves to extract out-band data. The converter 11 selects a specific channel and performs frequency conversion on a signal in the selected channel to form an IF signal as an output signal. The IF signal obtained in the output of the converter 11 is fed to a filter circuit 13 composed of a HPF and a LPF. In the filter circuit 13, the IF signal is separated into a high-band television IF signal Fv and a low-band audio IF signal Fa.

The television IF signal Fv separated by the filter circuit 13 is fed to an expansion circuit 14, in which the signal is descrambled. On the other hand, the audio IF signal is distributed by a branching device 15, so that a part of the signal is fed to a key signal detector 16 in which the key signal superimposed on the audio IF signal is extracted by use of envelope detecting means of the like. The key signal extracted by the key signal detector 16 is fed to an in-band data detection circuit 17, in which in-band data contained in the key signal are detected. A part of the in-band data thus detected is used for the generation of 6 dB and 10 dB expansion pulses. Another part of the in-band data is fed, together with the out-band data from the FSK receiver 12, to the CPU 18 which operates according to a predetermined program, so that the other part of the in-band data is processed by the CPU 18. The CPU 18 supplied with the in-band data and out-band data generates various kinds of control data.

The in-band data detection circuit 17 supplied with the key signal from the key signal detector 16 generates 6 dB or 10 dB expansion pulses in synchronism with the key signal and feeds these signals to the expansion circuit 14. The expansion circuit 14 expands the compressed television IF signal in the horizontal blanking interval and vertical blanking interval based on the expansion pulse having an amplitude corresponding to the expansion ratio, so that the signal is descrambled so as to be returned to the television IF signal before scrambling.

The television IF signal thus descrambled and the audio IF signal passed through the wave distributor 15 are mixed by a mixing circuit 19, and the mixed signal is output from the output terminal OUT.

Figure 9:
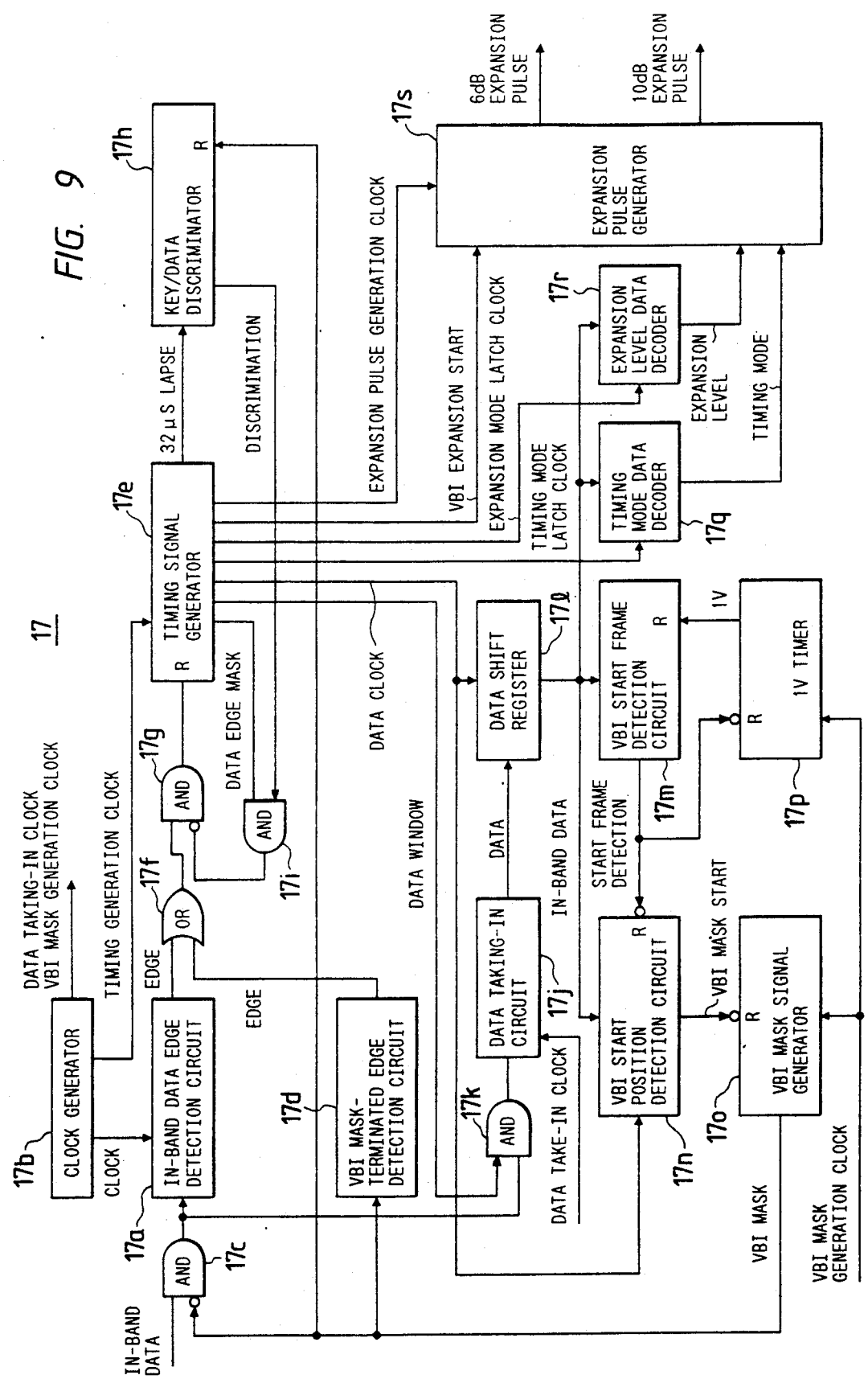
FIG. 9 is a block diagram showing the specific configuration of a circuit which is a part of the CATV terminal apparatus of FIG. 8.

FIG. 9 shows a specific example of the in-band data detection circuit 17. In the drawing, reference numeral 17a designates an in-band data edge detection circuit which operates based on a clock signal generated from a clock generator 17b. The circuit 17a serves to detect the rising edge of the key signal composed of keys and data and given from the key signal detector 16 through an AND gate 17c. The function of the circuit 17a is interrupted by a VBI mask signal which is given in an inverted state to one input of the AND gate 17c.

Reference numeral 17d designates a VBI mask-terminated edge detection circuit for detecting the end of the VBI masking period. The circuit 17d generates a reset signal for resetting a timing signal generator 17e, which will be described later, on the basis of the in-band data edge detected by the in-band data edge detection circuit 17a and the VBI mask-terminated edge detected by the circuit 17d.

Reference numeral 17e designates a timing signal generator which operates based on the timing generation clock obtained from the clock generator 17b. The timing signal generator 17e is reset based on the reset signal generated by the VBI mask-terminated edge detection circuit 17d and received through an OR gate 17f and an AND gate 17g, so that the generator 17e is initialized. The circuit 17e generates signals in respective portions of the in-band data detection circuit 17, such as a data edge mask signal for preventing the edge resetting by data, a data latch clock signal, a data window signal, a data clock signal for taking in data, an expansion pulse generation clock signal, and the like.

Reference numeral 17h designates a key/data discriminator for discriminating between key and data contained in the key signal. The discriminator 17h recognizes the key signal based on the fact that the transmission period of the key is different from the transmission period of the data, for example, by 19 μsec. That is to say, the discriminator 17h recognizes the key signal when 32 μsec have passed after the resetting of the timing signal generator 17e by the in-band data edge, because the period of one horizontal interval (1H) is 63.5 μsec. Accordingly, the relation $(63.5-19) > 63.5/2 \approx 32$ μsec is established. When the key signal is recognized as described above, the discriminator generates a discrimination signal to thereby control an AND gate 17i. The discriminating operation of the discriminator 17h is carried out once when ever the fetching of data in a field is started.

Reference numeral 17j designates a data taking-in circuit which operates based on the data fetch clock generated from the clock generator 17b. The circuit 17j takes in data for every 1 H through an AND gate 17k opened based on the data window signal generated by the timing signal generator 17e according to the discrimination signal from the key/data discriminator 17h.

Reference numeral 17l designates a data shift register which operates based on the data clock generated by the timing signal generator 17e. The shift register 17l serves to shift data fetched for every 1H by the data taking-in circuit 17j and is capable of access for every 8 bits.

Reference numeral 17m designates a VBI start frame detection circuit which serves to monitor data obtained from the data shift register 17l and detects the point of time that at least 16 data are all "1" continuously and the next data is "0", as a start frame. A start frame detection signal generated by the circuit is latched for the period of about 1V until the circuit is reset based on a 1V signal generated by a 1V timer 17p which will described later.

Reference numeral 17n designates a VBI start position detection circuit which operates based on the data clock obtained from the timing signal generator 17e. The circuit 17h latches VBI start data which is one of the in-band data from the data shift register 17l in response to the input of the start frame detection signal from the VBI start frame detection circuit 17m. The VBI start position detection circuit 17n detects the VBI start position based on the data clock in accordance with the latched data to thereby generate a VBI mask start signal clock signal so as to feed the VBI mask start signal to a VBI mask signal generator 17o which will be described later.

Reference numeral 17n designates a VBI start position detection circuit which operates based on the data clock obtained from the timing signal generator 17e. The circuit 17n latches VBI start data which is one of the in-band data from the data shift register 17l in response to the input of the start frame detection signal from the VBI start frame detection circuit 17m. The VBI start position detection circuit 17n detects the VBI start position based on the data clock in accordance with the latched data to thereby generate a VBI mask start signal clock signal so as to feed the VBI mask start signal to a VBI mask signal generator 17o which will be described later.

Reference number 17o designates the VBI mask signal generator which operates based on the VBI mask generation clock obtained from the clock generator 17b. The circuit 17o generates a VBI mask signal having a predetermined time length corresponding to the input of the VBI mask start signal from the VBI start position detection circuit 17n.

Reference numeral 17p designates a 1V timer which operates based on the VBI mask generation clock obtained from the clock generator 17b. The timer starts its operation corresponding to the input of the start frame detection signal from the VBI start frame detecting circuit 17m. The timer length is established to be shorter, (for example 196H), than the time required for obtaining the data "1" for the next start frame.

Reference numeral 17q designates a timing mode data decoder and 17r designates an expansion level data decoder These decoders 17q and 17r, respectively, perform sampling of timing mode data and expansion level data from corresponding portions of the in-band data stored in the data shift register 17l, on the basis of the expansion mode latch clock and timing mode latch clock obtained from the timing signal generator 17e, and decode the data to feed the decoded data to an expansion pulse generator 17s which will be described later.

Reference numeral 17s designates the expansion pulse generator which generates 6 dB and 10 dB expansion pulses based on the expansion pulse generation clock and VBI expansion start signal obtained from the timing signal generator 17e, the timing mode signal obtained from the timing mode data decoder 17q, and the expansion level signal obtained from the expansion level data decoder 17r.

The operation of the in-band data detection circuit 17 configured as described above will be described hereunder with reference to the timing charts of FIGS. 10 and 11.

The timing signal generator 17e, the data shift register 17l, the key/data discriminator 17h and the VBI start frame detection circuit 17m are reset in an initial condition. In such a condition, the AND gate 17c is open because the VBI mask signal is absent. The in-band data (the signal shown in FIGS. 2(b) and 3(b), respectively, are fed to the in-band data edge detection circuit 17a through the AND gate 17c, so that the rising edge of key or data in the key signal is detected as shown in FIG. 10(a). The in-band data edge detection circuit 17a generates an edge signal as shown in FIG. 10(b) in the output thereof corresponding to edge detection. In the case of FIG. 10, the edge signal received first is of a key in the key signal. The edge signal is fed to the AND gate 17g through the OR gate 17f. Because the key/data discriminator 17h is in a reset state, the discrimination signal is absent, so that the output level of the AND gate 17i is low. Accordingly, the AND gate 17g is open, so that the edge signal is fed to the timing signal generator 17e through the AND gate 17g.

The edge signal received in the timing signal generator 17e serves to reset the timing signal generator 17e and also serves to generate the timing mode latch clock, the expansion mode latch clock, the VBI expansion start signal, and the like, based on the count.

By the aforementioned resetting, the timing signal generator 17e generates a data edge mask signal as shown in FIG. 10(c) after the passage of a predetermined time (for example, 16 μsec). At this time, the discrimination signal from the key/data discriminator 17h is at a low level as shown in FIG. 10(d) and the AND gate 17g is open. Accordingly, an edge signal based on the next data is also fed to the timing generator 17e through the AND gate 17g. However, the timing signal generator 17e generates a 32 μsec lapse signal after the passage of 32 μsec after the input of the first edge signal. Accordingly, the key/data discriminator 17h generates a discrimination signal as shown in FIG. 10(d). As a result, the AND gate 17g is closed whenever a data edge mask signal is generated, so that the edge signal based on data is no longer fed to the timing signal generator 17e. The level of the discrimination signal is kept high until the key/data discriminator 17h is reset based on the VBI mask signal generated by the VBI mask signal generator 17o.

The timing signal generator 17e to which edge signals corresponding to keys are successively fed generates a data wind signal and a data clock in predetermined timing whenever an edge signal is received in the timing generator 17e. The data wind signal is fed to the AND gate 17k as an open signal for the AND gate 17k and the data clock is fed to both the data shift register 17l and VBI start position detection circuit 17n. When the AND gate 17k is opened base on the data wind signal, a data following the key is fetched in the data taking-in circuit 17j via the AND gate 17h. The data taken in the data taking-in circuit 17l is soon fed to the data shift register 17l. The data shift register 17l receives data fed to the input thereof based on the input of the data clock and shifts the data successively.

The data shift register 17l, which serves to keep the newest 8-bit data while aborting old data as described above, always feeds the kept data to the VBI start frame detection frame 17m, the VBI start position detection circuit 17n, the timing mode data decoder 17q, and the expansion level data decoder 17r.

The VBI start frame detection circuit 17m always monitors the data obtained from the data shift register 17l, so that when a VBI start frame is detected based on the fact that a bit of "0", appears after continuous 16 bits of "1", the circuit 17m generates a start frame detection signal. The start frame detection signal serves to reset both the VBI start position detection circuit 17n and the 1V timer 17p.

The VBI start position detection circuit 17n thus reset fetches the VBI start data following the VBI start frame successively from the data register 17l based on the data clock signal and generates a VBI mask start signal after the passage of the time of N X 8H synchronizing periods based on the number of N of the fetched VBI start data. The VBI mask start signal is fed to the VBI mask signal generator 17o, so that the VBI mask signal generator 17o generates a VBI mask signal in response to the VBI mask start signal.

The VBI mask signal is fed to the AND gate 17c to close it to thereby mask the pseudo-key signal inserted in the VBI. At the same time, the VBI mask signal is fed to the key/data discriminator 17h to reset it, and is also fed to the VBI mask-terminated edge detection circuit 17d to detect the rising edge thereof. By the closing of the AND gate 17c, the in-band data are suppressed from being fed to the in-band data edge detection circuit 17a and gate 17k while the VBI mask signal exists. Because no edge signal is given to the timing signal generator 17e during the period of the VBI mask signal, the timing signal generator 17e can know that the current period is a VBI mask period.

When the VBI mask signal then falls with the passage of time, the VBI mask-terminated detection circuit 17d detects the end of the VBI masking and generates an edge signal. The edge signal is fed to the AND gate 17g through the OR gate 17f. At this time, the AND gate 17g is open because the key/data discriminator 17h is in a reset state and, accordingly, the discrimination signal is absent. As a result, the edge signal generated from the VBI mask-terminated detection circuit 17d is fed to the timing signal generator 17e to thereby reset the timing signal generator 17e.

The operation after the resetting of the timing signal generator 17e is carried out in the same manner as described above with reference to the timing charts of FIG. 10. However, the operation thereafter is carried out based on the end of the VBI mask signal as shown in FIG. 11. Accordingly, the expansion pulse generation clock, the VBI expansion start signal, the expansion mode latch clock and the timing mode latch clock generated in predetermined timing by the timing signal generator 17e are issued at normal positions, respectively, so that predetermined data latching and predetermined expansion pulse generating operations can be made.

As described above, a television signal scrambled in the center side can be descrambled by using the in-band data detection circuit 17 as shown in FIG. 9, regardless of insertion of the pseudo-key signal in the VBI.

As described above, according to the scrambling method of the first aspect of the present invention, a pseudo-key signal is superimposed on an audio signal at a portion corresponding to a vertical blanking interval thereof, so that the VBI cannot be detected through detection of the audio signal. Accordingly, an expansion signal for expanding the signal in the horizontal blanking interval and vertical blanking interval compressed by scrambling cannot be formed in its normal position. Consequently, unauthorized access becomes difficult.

Further, according to the descrambling method and apparatus of the invention, the television signal can be descrambled through the steps of detecting the vertical blanking interval based on the information concerning the position of the vertical blanking interval, which information is contained in the key signal, and the decoding information for decoding the position information, which decoding information is transmitted in the form of out-band data; extracting information concerning the compression, which information contained in the key signal, based on the detected vertical blanking interval; generating an expansion signal for expanding the signal in the horizontal blanking interval and vertical blanking interval based on the extracted information concerning the compression; and expanding the signal in the horizontal blanking interval and the vertical blanking interval based on the expansion signal.

A preferred embodiment according to a second aspect of the invention will be described hereunder with reference to FIGS. 12 to 18.

FIG. 12 (a) through (f) and FIG. 13 (a) through (f) are timing charts showing video signals as to the front portions of fields 1 and 2 and the rear portions of fields prior to the fields 1 and 2, key signals, compression signals and expansion signals corresponding to the video signals, respectively. The television signal scrambling method and descrambling method according to the second aspect of the present invention will be described with reference to these drawings.

The television signal scrambling method according to the second aspect of the present invention is characterized by: compressing the television signal in an HBI and VBI based on a compression signal as shown in FIGS. 12(c) and 13(c), respectively; inserting a pseudo-key signal in one portion of an audio signal corresponding to the VBI of the video signal with the same period as that of a key signal inserted in the other portion thereof as shown in FIGS. 12(a) and (b) and 13(a) and (b), respectively; adding coded VBI position data to the key signal in the form of in-band data; and transmitting decoding data for decoding the coded position data in the form of out-band data. The aforementioned key and pseudo-key signals are superimposed on the audio signal by amplitude modulation in synchronism with the horizontal synchronizing signal in the same manner as the conventional key signal.

The relationship between in-band data and video synchronizing signal is shown in FIG. 14, in which for convenience of description numbers 1 through 525 are given to video synchronizing signals in the order numbered after the VBI of the previous frame; numbers D0 through D260 are given to in-band data corresponding to the video synchronizing signals 23 through 283; and numbers D'0 through D'262 are given to in-band data corresponding to the video synchronizing signals 284 through 22.

Being superimposed on an audio signal, start frames for expressing the forward end of the insertion position of data are transmitted by the audio signal through in-band data, D152 to D167 and D'153 to D'168; coded VBI start data for expressing the position of the VBI are transmitted by the audio signal through in-band data D168 to D175 and D'170 to D'177; VBI-reflected field data for expressing the number of frames to be skipped to obtain the VBI start positions given by the VBI start data are transmitted by the audio signal through in-band data D176 to D183 and D'178 to D'185; and compression data are transmitted by the audio signal through in-band data D184 to D191 and D'186 to D'193.

Other in-band data, such as timing mode data (expressing time from the key timing of a key signal to a horizontal synchronizing signal, being selected from 0, 4, 8, 12 and 16 μsec for every field and reporting the designated time to a terminal side), multi-mode data (expressing the mode of compression level), tag data, IPPV (impulse pay per view) even data, and the like, are superimposed on an audio signal and transmitted by the audio signal.

Importantly, the aforementioned coded VBI start data are switched for every program. In the beginning of every program, information for decoding the coded VBI start data is transmitted in the form of out-band data.

The video signal scrambled through compression based on the compression signal as shown in FIGS. 12(c) and 13(c), respectively, is received by a terminal. To perform descrambling, expansion signals as shown in FIGS. 12(d)-(f) and 13(d)-(f) are generated in the terminal based on the VBI start data and compression data in the in-band data decoded based on the decoding information received in the form of out-band data in advance.

The start frame in the in-band data is configured so that the current frame starts at the point in time when one bit "0", is detected after at least 16 bits "1" are detected continuously. The VBI start data is composed of 8 bits, inclusive of the first bit "0". Let the value of the VBI start data be L. The VBI-reflected field data is information for expressing the number of fields to be skipped to perform an arithmetic operation for detecting the VBI position based on the VBI start data. Let the value of the VBI-reflected field data be N. The compression data is data for expressing the size of compression of the horizontal synchronizing portion and VBI.

The out-band data is an operation code transmitted by out-band. Let the value of the operation code be $M_o$.

The terminal having received these data may perform an operation of $L \times 8H$ (H is a horizontal period) $+ M_o \times H$ to make it possible to detect that the VBI starts after the time $(L \times 8H + M_o \times H)$ after the detection of the start frame. In the alternative, the terminal may perform an operation using the VBI-reflected frame data N to make it possible to detect that the VBI starts after the time $\{(L \times 8H + M_o \times H) + N_r \text{ fields}\}$. The arithmetic operation is carried out for every field, so that the VBI position can be kept secret.

After the calculation of the start position of the VBI as described above, expansion signals are generated for the time of 22H and for the time of 21H in fields 1 and 2, respectively. The level of the respective expansion signal is selected from 0 dB, 6 dB and 10 dB based on the compression data, so that the received television signal is expanded based on the expansion signal to thereby descramble the television signal.

An example of the configuration of a center-side apparatus realizing the television signal scrambling method according to the present invention and an example of the configuration of a terminal apparatus realizing the method of descrambling the television signal scrambled by the scrambling method are described with reference to FIGS. 15 through 18.

Figure 15:
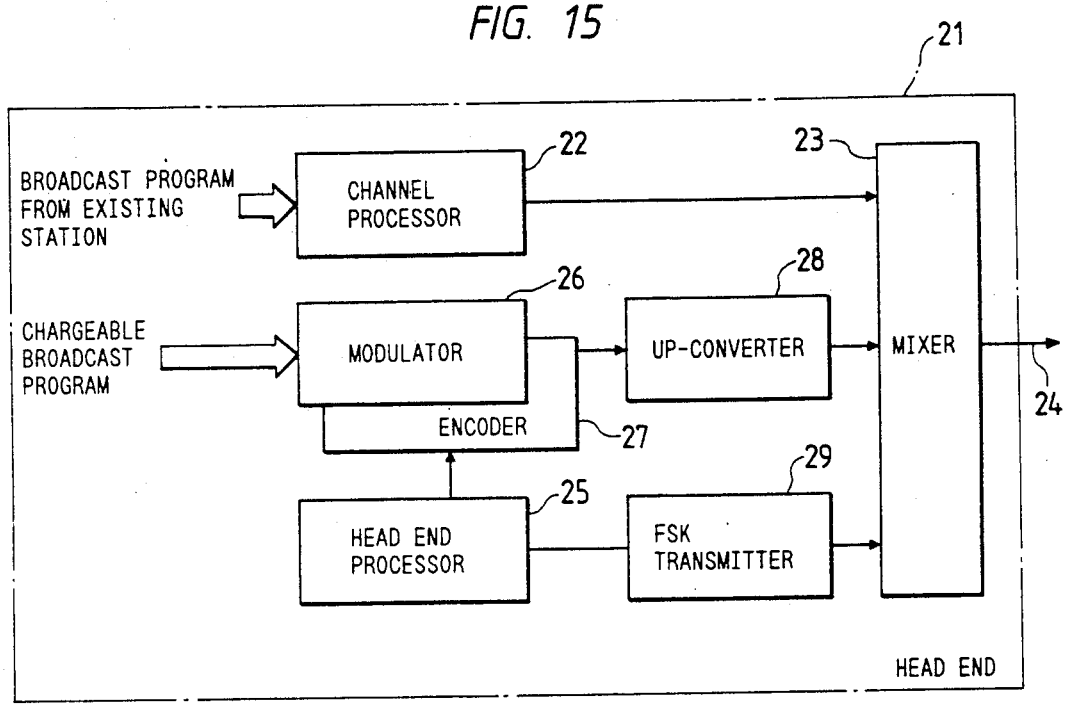
FIGS. 15 and 16 are block diagram showing the configuration of a CATV center using the method of the invention for performing scrambling.
Figure 16:
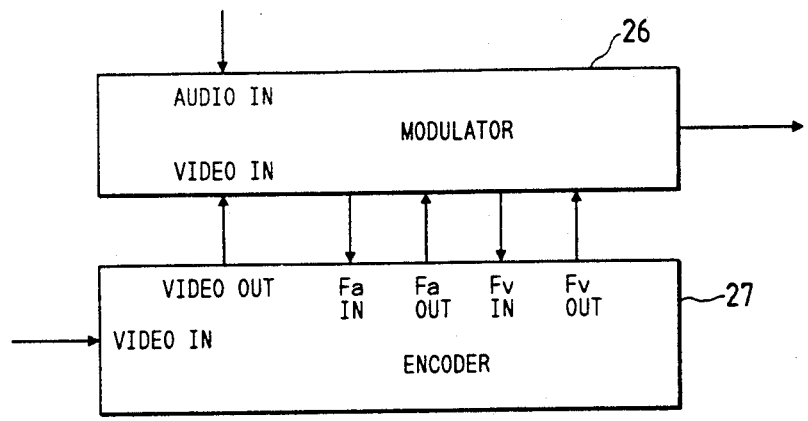

FIGS. 15 through 16 show an example of the configuration of a CATV center-side apparatus (also called the head end). In FIG. 15, a broadcast signal transmitted by radio from an existing broadcasting station and received through a VHF, UHF or BS antenna is fed to a channel processor 22 of a head end 21, and is subjected to frequency conversion into a predetermined RF frequency. Then the signal is mixed in a mixer 23 and transmitted to CATV terminal apparatus (not shown) through transmission line 24 for a large number of CATV subscribers.

The head end 21 has video sources, such a video cameras and video cassette recorders (VCR), for broadcasting self-produced programs. One of the video sources is selected under control by a head end processor 25, so that a video signal from the selected video source is fed to a modulator 26 and an encoder 27. The modulator 26 performs frequency conversion on the video signal given from the video source to change the frequency into a frequency for a specific channel. The frequency-converted signal is given a high frequency by an up-converter 28 and then fed to the mixer 23.

The head end processor 25 switches broadcasting programs automatically according to a program broadcasting schedule through video source selection or the like. Further, the head end processor 25 controls the encoding method in the encoder 27. The head end processor 25 also performs controlling to make an FSK transmitter 29 transmit data, such as viewing enable/disable data concerning the broadcasting of chargeable programs and the decoding data concerning scrambling, to a CATV terminal apparatus in the form of out-band data through the mixer 23 and transmission line 24.

FIG. 16 shows an example of the configuration of the modulator 26 and the encoder 27. In FIG. 16, an audio signal from a video source such as a video tape recorder and a video disc player is fed to the modulator 26. A video signal is fed to a video input terminal (VIDEO IN) of the encoder 27 which performs scrambling. The video signal is partly passed through the encoder 27 to be fed to a video input terminal (VIDEO IN) of the modulator 26 through a video output terminal (VIDEO OUT) of the encoder 27. The modulator 26 converts into IF signals the video and audio signals fed to the video input terminal (VIDEO IN) and the audio input terminal (AUDIO IN), respectively.

The television IF signal Fv and audio IF signal Fa thus converted by the modulator 27 are returned to the encoder 27 in which the television IF signal Fv is compressed in the horizontal blanking interval (HBI) and vertical blanking interval (VBI) at predetermined compression rates based on the compression signal as shown in FIGS. 12(c) and 13(c), respectively. Key and pseudo-key signals are superimposed on the audio IF signal Fa respectively at a portion corresponding to the horizontal synchronizing signal and in a VBI in a VBI in synchronism with the video synchronizing signal of the video signal.

The television IF signal Fv compressed in the HBI and VBI, and the audio IF signal Fa having the key and pseudo-key signals superimposed thereon as described above are fed from the encoder 28 to the modulator 26 in which the television IF signal Fv and the audio IF signal Fa are mixed and then sent out.

The encoder 27 has the same configuration and operation as the encoder 2 shown in FIG. 7. Therefore, the explanation for the encoder 27 is omitted here.

An example of the configuration of a CATV terminal apparatus for descrambling a signal scrambled in the CATV center side as described above with reference to FIGS. 15 and 16, and transmitted through the transmission line 24 will be described hereunder with reference to FIG. 17.

Figure 17:
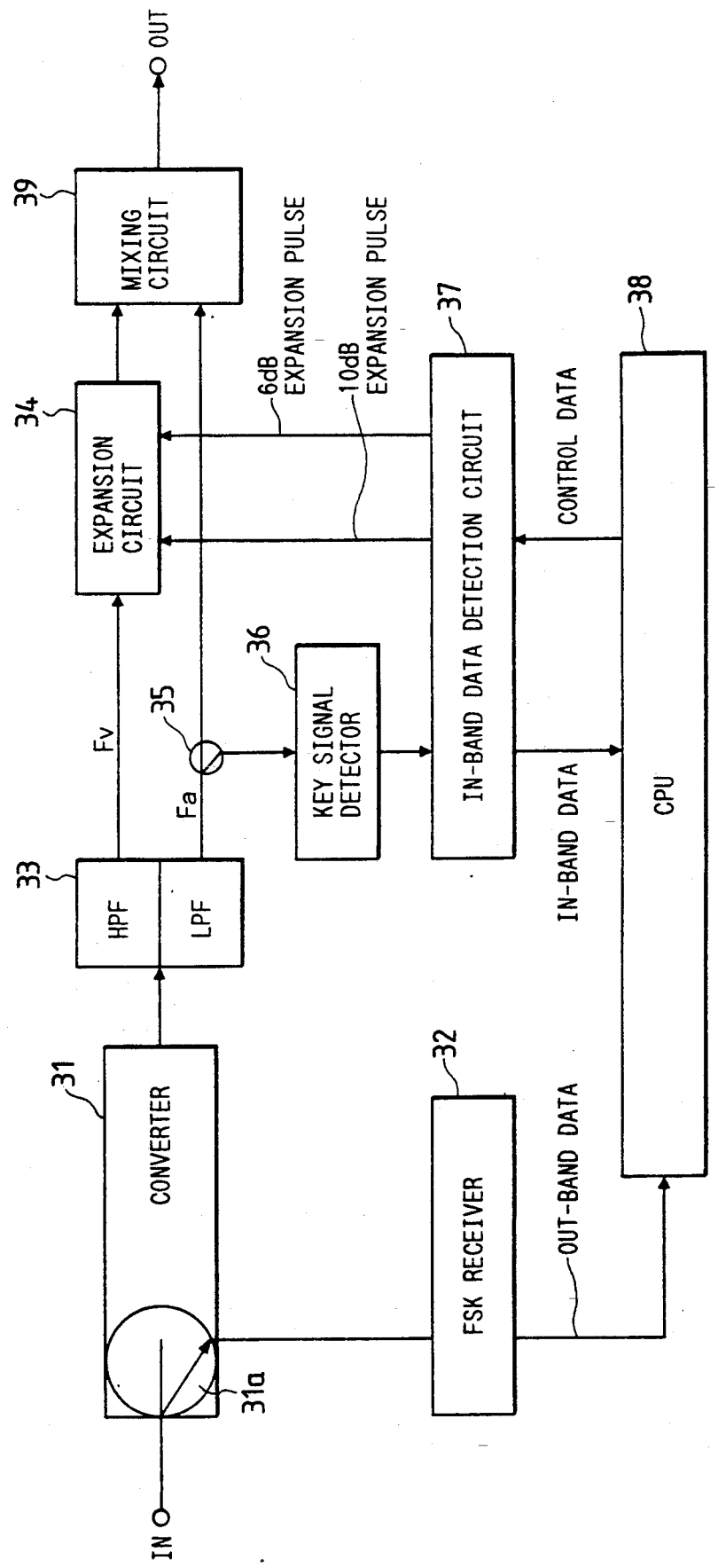
FIG. 17 is a block diagram showing the configuration of a CATV terminal apparatus for descrambling a signal scrambled by the method of the invention.

In FIG. 17, the signal transmitted through the transmission line is received in a converter 31 through an input terminal IN. The signal is distributed by a branching device 31a at the inlet portion of the converter 31, so that a part of the signal is fed to an FSK receiver 32 which serves to extract out-band data. The converter 31 selects a specific channel and performs frequency conversion on a signal in the selected channel to form an IF signal as an output signal. The IF signal obtained in the output of the converter 31 is fed to a filter circuit 33 composed of a HPF and a LPF. In the filter circuit 33, the IF signal is separated into a high-band television IF signal Fv and a low-band audio IF signal Fa. The FSK receiver 32 receives out-band data, such as viewing-enable/disable data concerning the broadcasting of pay programs and the decoding data concerning scrambling, from the FSK transmitter 29 of the head end 2 to feed the data to a CPU 38 before selection of the broadcasting program.

The television IF signal Fv separated by the filter circuit 33 is fed to an expansion circuit 34, in which the signal is descrambled. On the other hand, the audio IF signal is distributed by a branching device 35, so that a part of the signal is fed to a key signal detector 36 in which the key signal superimposed on the audio IF signal is extracted by use of envelope detecting means and the like. The key signal extracted by the key signal detector 36 is fed to an in-band data detection circuit 37, in which in-band data contained in the key signal are detected A part of the in-band data thus detected is used for generation of 6 dB and 10 dB expansion pulses. Another part of the in-band data is fed, together with the out-band data from the FSK receiver 32, to the CPU 38 which operates according to a predetermined program, so that the other part of the in-band data is processed by the CPU 38. The CPU 38 supplied with the in-band data and out-band data generates various kinds of control data and feeds the decoding data in out-band data received from the FSK receiver 32 to the in-band data detection circuit 37 to use the decoding data as a control data.

The in-band data detection circuit 37 supplied with the key signal from the key signal detector 36 generates 6 dB or 10 dB expansion pulses in synchronism with the horizontal synchronizing portion and VBI based on the control data given from the CPU 38 to feed these pulse signals to the expansion circuit 34. The expansion circuit 34 expands the compressed television IF signal in the horizontal blanking interval and vertical blanking interval based on the expansion pulse having an amplitude corresponding to the expansion rate, so that the signal is descrambled so as to be returned to the television IF signal before scrambling.

The television IF signal thus descrambled and the audio IF signal passed through the branching device 35 are mixed by a mixing circuit 39, and the mixed signal is output from the output terminal OUT.

Figure 18:
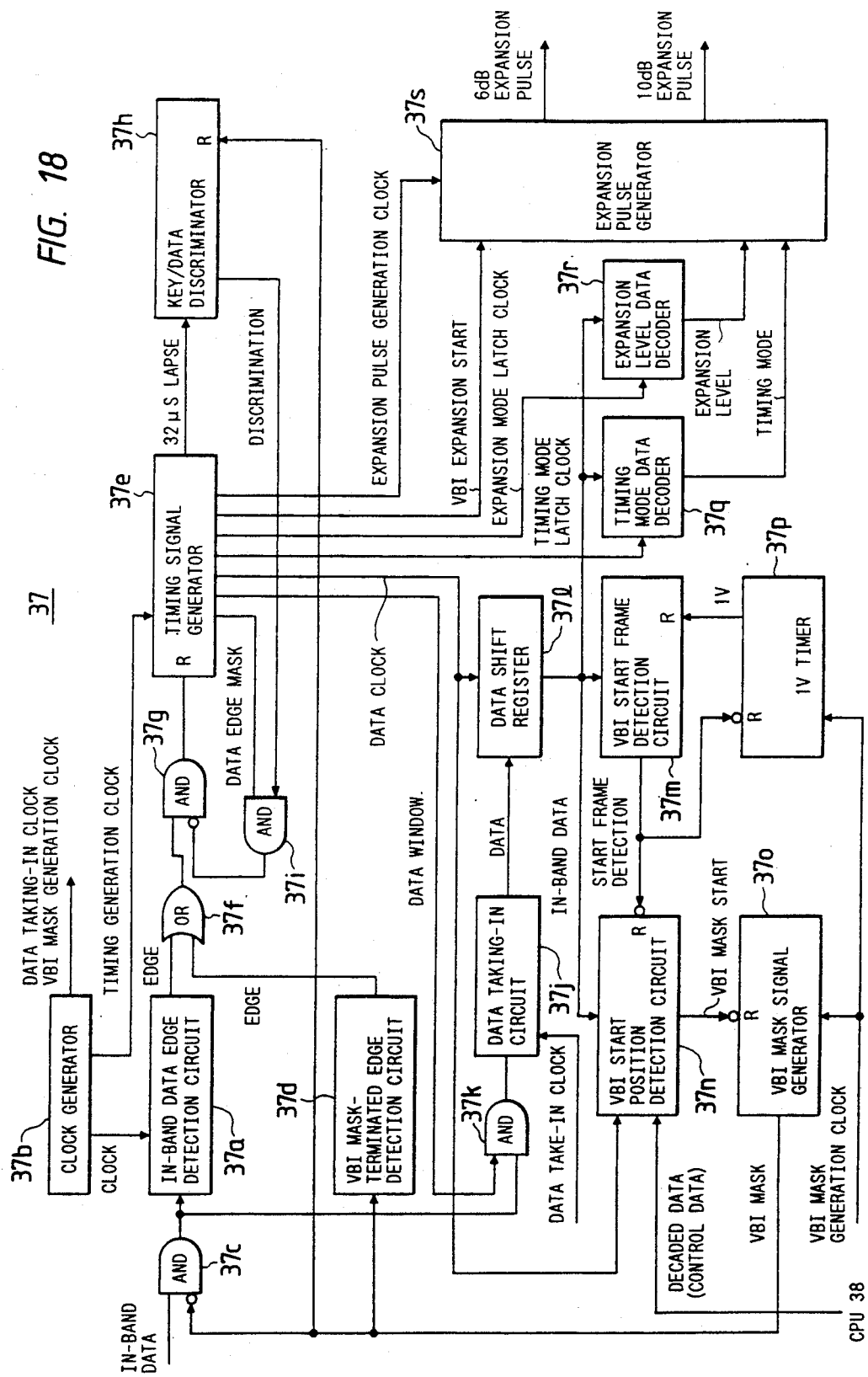
FIG. 18 is a block diagram showing the specific configuration of a circuit which is a part of the CATV terminal apparatus of FIG. 17.

FIG. 18 shows a specific example of the in-band data detection circuit 37. In the drawings, circuits 37a to 37m and 37o to 37s work in the same manner as the corresponding circuits in the in-band data detection circuit 17 of FIG. 9. Therefore, the explanation for these circuits is omitted here.

Reference numeral 37n designates a VBI start position detection circuit which operates based on the data clock obtained from the timing signal generator 37e. The circuit 37h latches VBI start data as one of the in-band data obtained from the data shift register 37l and a VBI-reflected field data following the VBI start data, based on the data clock signal in response to the input of the start frame detection signal from the VBI start frame detecting circuit 37m. Further, the VBI start position detection circuit 37n calculates the VBI start position based on these data and the decoding data given as a control data from the CPU 38 and, at the same time, generates a VBI mask start signal in the thus calculated VBI start position based on the data clock signal to feed the VBI mask start signal to a VBI mask signal generator 37o which will be described later.

The operation of the in-band data detection circuit 37 configured as shown in FIG. 18 is similar to that of the in-band detection circuit 17 of FIG. 9 except for the following (see FIGS. 10 and 11).

The reset VBI start position detection circuit 37n takes in both VBI start data following the VBI start frame and VBI-reflected field data successively from the data shift register 37l based on the data clock signal and generates a VBI mask start signal after the passage of the time of $\{(L \times 8H - M_o \times H) + N_r \text{ fields}\}$ which is calculated based on the thus taken in VBI start data "L", the VBI-reflected field data "N", and the decoding data "$M_o$" given as a control data from the CPU 38. The VBI mask start signal is fed to the VBI mask signal generator 37o, so that the VBI mask signal generator 37o generates a VBI mask signal in response to the VBI mask start signal.

The invention can be applied to the case where the VBI-reflected field data "$N_r$" is established to be zero so that the VBI mask signal is generated after the passage of the time of $(L \times 8H + M_o \times H)$ after the detection of the start frame.

As described above, a television signal scrambled in the center side can be descrambled by using the in-band data detection circuit 37 as shown in FIG. 18, regardless of insertion of the pseudo-key signal in the VBI.

As described above, according to the scrambling method of the second aspect of the present invention, a pseudo-key signal is superimposed on an audio signal at a portion corresponding to a vertical blanking interval thereof, so that the VBI cannot be detected through detection of the audio signal. Accordingly, an expansion signal for expanding the signal in the horizontal blanking interval and vertical blanking interval compressed by scrambling cannot be formed in its normal position. Consequently, unauthorized access becomes difficult.

Further, according to the descrambling method and apparatus of the invention, the television signal can be descrambled through the steps of detecting the vertical blanking interval based on the information concerning the position of the vertical blanking interval, which information is contained in the key signal, and the decoding information for decoding the position information, which decoding information is transmitted in the form of out-band data; extracting information concerning the compression, which information contained in the key signal, based on the detected vertical blanking interval; generating an expansion signal for expanding the signal in the horizontal blanking interval and vertical blanking interval based on the extracted information concerning the compression; and expanding the signal in the horizontal blanking interval and the vertical blanking interval based on the expansion signal.

Although the embodiments have shown the case where the start frame data is fixed, the invention can be applied to the case where a pattern of the start frame may be reported in the form of out-band data.

What is claimed is:

1. A method for scrambling a television signal in which a television signal is compressed in a horizontal blanking interval and in a vertical blanking interval, and a key signal containing information concerning the compression is superimposed on an audio signal during said horizontal blanking interval, said method comprising the steps of:

superimposing a pseudo-key signal, which is a pulse signal similar to said key signal, on said audio signal during said vertical blanking interval; and making said key signal contain information concerning a position of said vertical blanking interval.

2. A method for descrambling a television signal scrambled by compressing said television signal in a horizontal blanking interval and in a vertical blanking interval, said television signal being transmitted with an audio signal on which a key signal containing information concerning said compression and information concerning a position of said vertical blanking interval is superimposed at a portion of said audio signal corresponding to said horizontal blanking interval and on which a pseudo-key signal is superimposed at a portion of said audio signal corresponding to said vertical blanking interval, said method comprising the steps of:

detecting said vertical blanking interval based on said information concerning said position of said vertical blanking interval contained in said key signal;

extracting said information concerning said compression and contained in said key signal, based on the thus detected vertical blanking interval;

generating an expansion signal for expanding said television signal in said horizontal blanking interval and said vertical blanking interval based on said extracted information concerning said compression; and expanding said television signal in said horizontal blanking interval and said vertical blanking interval based on said expansion signal to thereby descramble said television signal.

3. An apparatus for descrambling a television signal scrambled by compressing said television signal in a horizontal blanking interval and in a vertical blanking interval, said television signal being transmitted with an audio signal on which a key signal containing information concerning said compression and information concerning a position of said vertical blanking interval is superimposed at a portion of said audio signal corresponding to said horizontal blanking interval and on which a pseudo-key signal is superimposed at a portion of said audio signal corresponding to said vertical blanking interval, said apparatus comprising:

vertical blanking interval detection means for detecting said vertical blanking interval based on said information concerning said position of said vertical blanking interval contained in said key signal;

information extracting means for extracting said information concerning said compression and contained in said key signal, based on said detected vertical blanking interval detected by said vertical blanking interval detection means;

expansion signal generation means for generating an expansion signal for expanding said television signal in said horizontal blanking interval and said vertical blanking interval based on said information concerning said compression extracted by said information extraction means; and descrambling means for expanding said television signal in said horizontal blanking interval and said vertical blanking interval based on said expansion signal generated by said expansion signal generation means to thereby descramble said television signal.

4. A method for scrambling a television signal in which a television signal is compressed in a horizontal blanking interval and in a vertical blanking interval, and a key signal containing information concerning said compression is superimposed on an audio signal during said horizontal blanking interval, comprising the steps of:

superimposing a pseudo-key signal on said audio signal during said vertical blanking interval;

making said key signal contain information concerning a position of said vertical blanking interval; and transmitting in the form of out-band data information to be used in decoding said information concerning said position.

5. A method for descrambling a television signal which is scrambled by compressing a television signal in a horizontal blanking interval and in a vertical blanking interval, based on a key signal superimposed on a portion of an audio signal corresponding to said horizontal blanking interval and containing information concerning said compression and information concerning a position of said vertical blanking interval in the form of in-band data, and based on information transmitted in the form of out-band data and used in decoding said information concerning said position of said vertical blanking interval, said audio signal containing a pseudo-key signal superimposed on a portion thereof corresponding to said vertical blanking interval, said method comprising the steps of:

decoding said information concerning said position of said vertical blanking interval and contained in said key signal, based on said information transmitted in the form of out-band data;

detecting said vertical blanking interval based on said decoded information;

extracting said information concerning said compression and contained in said key signal, based on said detected vertical blanking interval;

generating an expansion signal for expanding said television signal in said horizontal blanking interval and said vertical blanking interval based on said extracted information concerning said compression; and expanding said television signal in said horizontal blanking interval and in said vertical blanking interval based on said expansion signal to thereby descramble said television signal.

6. An apparatus for descrambling a television signal which is scrambled by compressing a television signal in a horizontal blanking interval and in a vertical blanking interval, based on a key signal superimposed on a portion of an audio signal corresponding to said horizontal blanking interval and containing information concerning said compression and information concerning a position of said vertical blanking interval in the form of in-band data, and based on information transmitted in the form of out-band data and used in decoding said information concerning said position of said vertical blanking interval, said audio signal containing a pseudo-key signal superimposed on a portion thereof corresponding to said vertical blanking interval, said apparatus comprising:

decoding means for decoding said information concerning said position of said vertical blanking interval and contained in said key signal, based on said information transmitted in the form of out-band data;

vertical blanking interval detection means for detecting said vertical blanking interval based on said decoded information;

information extracting means for extracting said information concerning said compression and contained in said key signal, based on said vertical blanking interval detected by said vertical blanking interval detection means;

expansion signal generating means for generating an expansion signal for expanding said television signal in said horizontal blanking interval and said vertical blanking interval based on said information concerning said compression and extracted by said information extracting means; and descrambling means for expanding said television signal in said horizontal blanking interval and said vertical blanking interval based on said expansion signal to thereby descramble said television signal.

7. A CATV center-side apparatus comprising:

video and audio source means for providing a video signal and an audio signal;

modulator means for covering said video signal and said audio signal into intermediate frequency (IF) signals, respectively;

encoding means for compressing said video IF signal from said modulator means in a horizontal blanking interval and in a vertical blanking interval at a predetermined compression rate and for superimposing key and pseudo-key signals on said audio IF signal, respectively, at portions corresponding to said horizontal blanking interval and said vertical blanking interval; and up-converter means for converting said video and audio IF signals to a predetermined frequency for transmission.

8. A CATV center-side apparatus as claimed in claim 7, wherein said encoding means comprises:

synchronizing signal separating means, receiving an input video signal, for extracting a horizontal synchronizing signal and a vertical synchronizing signal from said video signal;

first and second pulse generating means, having as inputs said horizontal synchronizing signal and said vertical synchronizing signal, for generating pulses;

control means for controlling said first and second pulse generating means and for establishing said predetermined compression rate corresponding to a predetermined number of said vertical synchronizing signals counted by said control means; and first and second switching means, responsive to said first and second pulse generating means, for compressing signals input thereto by predetermined amounts.

9. A CATV terminal apparatus for descrambling a transmitted signal comprising:

converter means, responsive to said transmitted signal, for selecting a specific channel and for frequency converting a signal in said specific channel to form an IF signal;

filter means connected to said converter means for filtering said IF signal into a high-band video IF signal and a low-band audio IF signal;

expansion circuit means connected to said filter means for descrambling said high-band video IF signal;

branching means connected to said filter means for branching said low-band audio IF signal into first and second parts;

key signal detecting means, having as an input said first part of said low-band audio IF signal, for extracting a key signal superimposed on said audio IF signal;

in-band data detecting means connected to an output of said key signal detecting means for detecting in-band data contained in said key signal and for generating expansion pulses for use by said expansion circuit means; and mixing means for mixing said video IF signal descrambled by said expansion circuit means and said second part of said audio IF signal.

10. In a method for scrambling a television signal in which a television signal is compressed during a horizontal blanking interval and during a vertical blanking interval, and a key signal containing information concerning the compression is superimposed on an audio signal during said horizontal blanking interval, the improvement comprising:

providing in said key signal information concerning the position of said vertical blanking interval.

11. An apparatus for descrambling a television signal scrambled by compressing said television signal during a horizontal blanking interval and during a vertical blanking interval, said television signal being transmitted with an audio signal on which a key signal containing information concerning said compression and information concerning the position of said vertical blanking interval is superimposed at a portion of said audio signal corresponding to said horizontal blanking interval, said apparatus comprising:

vertical blanking interval detection means for detecting said vertical blanking interval based on said information concerning said position of said vertical blanking interval contained in said key signal;

information extracting means for extracting said information concerning said compression and contained in said key signal, based on said detected vertical blanking interval detected by said vertical blanking interval detection means;

expansion signal generation means for generating an expansion signal for expanding said television signal in said horizontal blanking interval and said vertical blanking interval based on said information concerning said compression extracted by said information extraction means; and descrambling means for expanding said television signal in said horizontal blanking interval and said vertical blanking interval based on said expansion signal generated by said expansion signal generation means to thereby descramble said television signal.

12. A method for scrambling a television signal in which a television signal is compressed during a horizontal blanking interval and during a vertical blanking interval, and a key signal containing information concerning said compression is superimposed on an audio signal during said horizontal blanking interval, comprising the steps of:

providing in said key signal information concerning the position of said vertical blanking interval; and transmitting in the form of out-band data information to be used in decoding said information concerning said position.

13. A CATV center-side apparatus comprising:

video and audio source means for providing a video signal and an audio signal;

modulator means for converting said video signal and said audio signal into intermediate frequency (IF) signals, respectively;

encoding means for compressing said video IF signal from said modulator means during a horizontal blanking interval and during a vertical blanking interval at a predetermined compression rate and for superimposing a key signal on said audio IF signal at a position corresponding to said horizontal blanking interval; and up-converter means for converter said video and audio IF signals to a predetermined frequency for transmission.

14. The method as claimed in claim 1 further comprising the steps of:

compressing said television signal such that compression rates of said horizontal and vertical blanking intervals are changed with time independently of each other; and providing in said key signal information concerning both of said compression rates.

15. The method as claimed in claim 10 further comprising the steps of:

compressing said television signal such that compression rates of said horizontal and vertical blanking intervals are changed with time independently of each other; and providing in said key signal information concerning both of said compression rates.

* * * * *